United States Patent
Eguchi et al.

(10) Patent No.: US 9,310,522 B2
(45) Date of Patent: Apr. 12, 2016

(54) OPTICAL LAYERED BODY, METHOD FOR PRODUCING OPTICAL LAYERED BODY, POLARIZER AND IMAGE DISPLAY DEVICE

(75) Inventors: Junya Eguchi, Tokyo (JP); Tasuku Kitamura, Tokyo (JP); Yuki Ichikawa, Tokyo (JP); Takashi Kodama, Tokyo (JP)

(73) Assignee: Dai Nippon Printing Co., Ltd., Tokyo (JP)

( * ) Notice: Subject to any disclaimer, the term of this patent is extended or adjusted under 35 U.S.C. 154(b) by 0 days.

(21) Appl. No.: 13/697,462

(22) PCT Filed: May 12, 2011

(86) PCT No.: PCT/JP2011/060982
§ 371 (c)(1),
(2), (4) Date: Jan. 28, 2013

(87) PCT Pub. No.: WO2011/142433
PCT Pub. Date: Nov. 17, 2011

(65) Prior Publication Data
US 2014/0106122 A1   Apr. 17, 2014

(30) Foreign Application Priority Data
May 12, 2010 (JP) ................................. 2010-110526

(51) Int. Cl.
*G02B 1/08* (2006.01)
*G02B 5/30* (2006.01)

(52) U.S. Cl.
CPC ............... *G02B 1/08* (2013.01); *G02B 5/3025* (2013.01); *Y10T 428/24364* (2015.01); *Y10T 428/256* (2015.01); *Y10T 428/31533* (2015.04)

(58) Field of Classification Search
CPC ............ B32B 27/18; B32B 7/02; C08K 3/00; C08L 1/12; G02B 5/30; G02B 1/08; G02F 1/1335; Y10T 428/31533; Y10T 428/24364; Y10T 428/256
USPC .......................................... 428/142, 328, 419
See application file for complete search history.

(56) References Cited

U.S. PATENT DOCUMENTS

2006/0262260 A1* 11/2006 Majumdar et al. ............ 349/122
2007/0247710 A1    10/2007 Nakashima et al.
2009/0268299 A1    10/2009 Furui et al.
2009/0280317 A1* 11/2009 Nakashima et al. .......... 428/332

(Continued)

FOREIGN PATENT DOCUMENTS

CN    101006367 A    7/2007
CN    101454692 A    6/2009

(Continued)

*Primary Examiner* — Nathan Van Sell
(74) *Attorney, Agent, or Firm* — Hamre, Schumann, Mueller & Larson, P.C.

(57) ABSTRACT

The present invention provides an optical layered body which stably keeps light resistance such as ultraviolet resistance and oxidation resistance while keeping conventional physical properties and optical properties as the outermost surface material of an image display device, which is excellent in an antistatic property and which is capable of providing high image contrast when employed for an image display device. The optical layered body has a light transmitting substrate and a resin layer formed on one surface of the light transmitting substrate and is characterized in that the resin layer contains a binder resin, a polythiophene, an auxiliary conductive agent, and a leveling agent.

15 Claims, 2 Drawing Sheets

(56) References Cited

U.S. PATENT DOCUMENTS

| | | | |
|---|---|---|---|
| 2009/0286070 A1* | 11/2009 | Sueyoshi et al. | 428/336 |
| 2009/0316271 A1* | 12/2009 | Shibayama | 359/601 |
| 2010/0020398 A1 | 1/2010 | Horio et al. | |

FOREIGN PATENT DOCUMENTS

| | | | | |
|---|---|---|---|---|
| JP | 2005-350622 A | 12/2005 | | |
| JP | 2006-023350 A | 1/2006 | | |
| JP | 2006-028439 A | 2/2006 | | |
| JP | 2007-237580 A | 9/2007 | | |
| JP | 2008-032845 A | 2/2008 | | |
| JP | 2008-045116 A | 2/2008 | | |
| JP | 2008-222850 A | 9/2008 | | |
| JP | 2010-002820 A | 1/2010 | | |
| JP | 2010-044417 A | 2/2010 | | |
| JP | 2010-055944 A | 3/2010 | | |
| TW | 200821343 A | 5/2008 | | |
| WO | WO 2007114364 A1 * | 10/2007 | | G02B 1/10 |
| WO | WO-2008/020587 A1 | 2/2008 | | |

* cited by examiner

31 Region where the polythiophene exists
30 Resin layer
32 Region where the auxiliary conductive agent exists 41 Region where the polythiophene and the auxiliary conductive agent exist
40 Resin layer 51 Region where the polythiophene and the auxiliary conductive agent exist
50 Resin layer
52 Region where the auxiliary conductive agent exists

OPTICAL LAYERED BODY, METHOD FOR PRODUCING OPTICAL LAYERED BODY, POLARIZER AND IMAGE DISPLAY DEVICE

CROSS REFERENCE TO RELATED APPLICATIONS

This application is a National Phase filing under 35 U.S.C. §371 of PCT/JP2011/060982 filed on May 12, 2011; and this application claims priority to Application No. 2010-110526 filed in Japan on May 12, 2010 under 35 U.S.C. §119; the entire contents of all are hereby incorporated by reference.

TECHNICAL FIELD

The present invention relates to an optical layered body, a method for producing an optical layered body, a polarizer, and an image display device.

BACKGROUND ART

An optical layered body composed of functional layers having various properties such as an antiglare property, an antireflection property, and an antistatic property is formed on the outermost surface of an image display device such as a cathode ray tube display device (CRT), a liquid crystal display (LCD), a plasma display (PDP), an electroluminescence display (ELD), a field emission display (FED), a touch panel, or electronic paper.

Such an optical layered body is generally required to have characteristics such as light resistance, that is, UV resistance and oxidation resistance since being set on the outermost surface of an image display device.

Conventionally, in an optical layered body, in order to prevent stains due to deposition of dust or the like because of charge or occurrence of hindrance at the time of use or in the display production process, a resin layer containing an antistatic agent, which is a conductive material, is formed.

Materials known as an antistatic agent to be used for the optical layered body are inorganic materials, e.g., conductive fine particles of metal oxides, for example, antimony-doped tin oxide (ATO), tin-doped indium oxide (ITO), and the like, and carbon (Patent Literatures 1 and 2). However, inorganic materials such as metal oxides have a problem that if the addition amount is large, the light transmittance of an optical layered body is reduced or that the contrast of an image is reduced in the case of installation in an image display device.

Materials also known as the antistatic agent are organic materials such as conductive polymers and quaternary ammonium conductive materials (Patent Literature 2).

Patent Literature 3 discloses an antistatic resin composition characterized by containing a soluble conductive polymer component including a solubilized polymer component having an anionic group and/or an electron-withdrawing group in its molecule and a conductive polymer component, and a hard coat component.

Patent Literature 4 discloses a conductive polymer solution characterized by containing a soluble conductive polymer component including a solubilized polymer component having an unsaturated double bond at the terminal of a side chain of a molecule and a conductive polymer component, as well as a photocurable monomer and/or an organic solvent.

Patent Literature 5 or 6 discloses a conductive polymer/dopant complex-containing organic solvent dispersion containing a conductive polymer, a dopant, as well as a dispersant containing at least one selected from the group consisting of amide compounds or amines having a radical polymerizable group and nonionic surfactants and having a water content of 20 wt. % or less.

However, in the case of using these organic conductive materials and antistatic resin compositions for producing an optical layered body, an optical layered body having a desired antistatic property can be obtained, but it is impossible to obtain an optical layered body which has a sufficiently high contrast of an image while keeping conventional physical characteristics (hard coat property and the like) and optical characteristics (light transmitting property, antiglare property and the like).

Recently, further improvement of the quality of a display image is desired and it is required to realize an optical layered body which can give a higher contrast of an image.

Patent Literatures 5 and 6 disclose usability of polythiophenes as conductive polymers. However, since having no ultraviolet resistance and oxidation resistance, polythiophenes are inconveniently deteriorated in the antistatic property in the case a composition containing polythiophenes is used for producing an optical layered body.

CITATION LIST

Patent Literature

Patent Literature 1: Japanese Kokai Publication 2008-032845
Patent Literature 2: Japanese Kokai Publication 2006-023350
Patent Literature 3: Japanese Kokai Publication 2005-350622
Patent Literature 4: Japanese Kokai Publication 2006-028439
Patent Literature 5: Japanese Kokai Publication 2008-222850
Patent Literature 6: Japanese Kokai Publication 2008-045116

SUMMARY OF THE INVENTION

Technical Problem

In view of the above state of the art, it is an object of the present invention to provide an optical layered body which stably keeps light resistance such as ultraviolet resistance and oxidation resistance while keeping conventional physical properties and optical properties as the outermost surface material of an image display device, which is excellent in an antistatic property and production stability and which is capable of providing high image contrast when employed for an image display device.

Solution to Problem

The present invention provides an optical layered body having a light transmitting substrate and a resin layer formed on one surface of the light transmitting substrate, in which the resin layer comprises a binder resin, a polythiophene, an auxiliary conductive agent, and a leveling agent.

The optical layered body of the present invention preferably has a content of the polythiophene of 0.1 to 1.0 part by weight relative to 100 parts by weight of the binder resin.

The polythiophene preferably contains an anionic compound.

The auxiliary conductive agent is preferably at least one kind selected from the group consisting of chain-like metal oxide particles, carbon nanotubes, and conductive fine particles.

The auxiliary conductive agent is preferably chain-like metal oxide particles and/or conductive fine particles and the content of the auxiliary conductive agent is preferably 0.5 to 5.0 parts by weight relative to 100 parts by weight of the binder resin.

The auxiliary conductive agent is preferably carbon nanotubes and the content of the auxiliary conductive agent is preferably 0.001 to 0.13 parts by weight relative to 100 parts by weight of the binder resin.

The optical layered body of the present invention preferably has an initial surface resistance value and a surface resistance value after a light resistance test of the resin layer of less than $1 \times 10^{12} \Omega/\square$.

The resin layer preferably further contains an additive having a protonic functional group.

The additive having a protonic functional group is preferably epoxy acrylate.

The resin layer preferably has an antiglare function.

The resin layer preferably has a region containing no auxiliary conductive agent from the interface on the opposite side to the light transmitting substrate to 100 nm.

The optical layered body of the present invention preferably further has a rough surface under coat layer on the light transmitting substrate and the resin layer formed on the rough surface under coat layer.

The present invention also provides a method for producing an optical layered body having a light transmitting substrate and a resin layer formed on one surface of the light transmitting substrate, wherein the method includes a step of forming the resin layer using a resin layer composition comprising a binder resin, a polythiophene, an auxiliary conductive agent, a leveling agent, and a solvent.

In the method for producing an optical layered body of the present invention, the content of water in the resin layer composition is preferably 20 wt. % or less.

The present invention also provides a polarizer having a polarizing element, wherein the polarizer has the optical layered body on a surface of the polarizing element.

The present invention also provides an image display device having the optical layered body or the polarizer on an outermost surface.

Hereinafter, the present invention will be described in detail.

The present invention provides an optical layered body having a light transmitting substrate and a resin layer formed on one surface of the light transmitting substrate, in which the resin layer comprises a specified component. Accordingly, the optical layered body of the present invention can stably keep light resistance such as ultraviolet resistance and oxidation resistance while keeping conventional physical properties (hardness, hard coatability, and the like) and optical properties (light transmitting property, antiglare property, and the like) as an outermost surface material of an image display device, is excellent in an antistatic property and is capable of providing high image contrast when employed for an image display device.

Specifically, in the optical layered body of the present invention, the resin layer is a layer comprising a binder resin, a polythiophene, an auxiliary conductive agent, and a leveling agent.

Since the resin layer contains such specified components, even if the content of the polythiophene in the resin layer is low in the optical layered body of the present invention, the optical layered body has high conductivity and shows an excellent antistatic property. Since the content of the polythiophene in the resin layer can be reduced, the optical layered body of the present invention can maintain a high light transmitting property. In the case the optical layered body of the present invention is employed for an image display device, the optical layered body can improve the contrast of an image to be displayed. Since containing the auxiliary conductive agent, the resin layer is provided with improved ultraviolet resistance and oxidation resistance while keeping the above-mentioned excellent properties.

The optical layered body of the present invention is also excellent in production stability. In this description, "production stability" means that there is little unevenness of initial surface resistance value in a plane of the resin layer.

The way of employing the optical layered body of the present invention for a device such as an image display device is necessary to be application in a large size of more than 1 m² and the optical layered body needs to be mass-produced. In the case of production in such a way, the properties in a plane of the resin layer may become uneven due to unevenness of coating thickness and dispersion unevenness of the coating liquid and it is sometimes impossible to obtain desired properties stably in a plane. In this case, the production manner is unsuitable for mass production and the productivity cannot be stabilized. Contrarily, since particularly a polythiophene and an auxiliary conductive agent exist in a desired state in the resin layer, the optical layered body of the present invention is provided with a stabilized surface resistance value at the initial stage and after a light resistance test and also an initial surface resistance value stable in a plane.

The polythiophene in the optical layered body of the present invention is a component functioning as an antistatic agent for providing conductivity to the resin layer and may be a substituted or unsubstituted one.

The polythiophene can give sufficient conductivity to a resin layer as being unsubstituted. However, in order to improve the conductivity, it is preferable to introduce a functional group such as an alkyl group, a carboxyl group, a sulfo group, an alkoxy group, a hydroxy group or a cyano group into the molecule.

Specific examples of the polythiophene include poly(thiophene), poly(3-methylthiophene), poly(3-ethylthiophene), poly(3-propylthiophene), poly(3-butylthiophene), poly(3-hexylthiophene), poly(3-heptylthiophene), poly(3-octylthiophene), poly(3-decylthiophene), poly(3-dodecylthiophene), poly(3-octadecylthiophene), poly(3-bromothiophene), poly(3-chlorothiophene), poly(3-iodothiophene), poly(3-cyanothiophene), poly(3-phenylthiophene), poly(3,4-dimethylthiophene), poly(3,4-dibutylthiophene), poly(3-hydroxythiophene), poly(3-methoxythiophene), poly(3-ethoxythiophene), poly(3-butoxythiophene), poly(3-hexyloxythiophene), poly(3-heptyloxythiophene), poly(3-octyloxythiophene), poly(3-decyloxythiophene), poly(3-dodecyloxythiophene), poly(3-octadecyloxythiophene), poly(3,4-dihydroxythiophene), poly(3,4-dimethoxythiophene), poly(3,4-diethoxythiophene), poly(3,4-dipropoxythiophene), poly(3,4-dibutoxythiophene), poly(3,4-dihexyloxythiophene), poly(3,4-diheptyloxythiophene), poly(3,4-dioctyloxythiophene), poly(3,4-didecyloxythiophene), poly(3,4-didodecyloxythiophene), poly(3,4-ethylenedioxythiophene), poly(3,4-propylenedioxythiophene), poly(3,4-butenedioxythiophene), poly(3-methyl-4-methoxythiophene), poly(3-methyl-4-ethoxythiophene), poly(3-carboxythiophene), poly(3-methyl-4-carboxythiophene), poly(3-methyl-4-carboxyethylthiophene), and poly(3-methyl-4-carboxybutylthiophene). Especially, poly(3,4-ethylenedioxythiophene) is preferable since it is excellent in compatibility with a binder resin.

The polythiophene is preferably a complex with an anionic compound (hereinafter, also referred to as a polythioiphene complex).

The anionic compound may be those having, as an anionic group, a functional group which may cause chemical oxidation doping of the polythiophene. In terms of production easiness and stability, especially preferable examples include a mono-substituted sulfuric acid ester group, a mono-substituted phosphoric acid ester group, a phosphoric acid group, a carboxyl group, and a sulfo group. In terms of the effect of doping the polythiophene component with the functional group, more preferable examples include a sulfo group, a mono-substituted sulfuric acid ester group, and a carboxyl group.

Specific examples of the anionic compound include polyvinylsulfonic acid, polystyrenesulfonic acid, polyallylsulfonic acid, poly(ethyl acrylate)sulfonic acid, poly(butyl acrylate)sulfonic acid, poly-2-acrylamide-2-methylpropanesulfonic acid, polyisoprenesulfonic acid, polyvinylcarboxylic acid, polystyrenecarboxylic acid, polyallylcarboxylic acid, polyacrylcarboxylic acid, polymethacrylcarboxylic acid, poly-2-acrylamide-2-methylpropanecarboxylic acid, polyisoprenecarboxylic acid, and poly(acrylic acid). The anionic compound may be homopolymers or copolymers of two or more kinds of them. Preferable examples among them include polystyrenesulfonic acid, polyisoprenesulfonic acid, poly(ethyl acrylate)sulfonic acid, and poly(butyl acrylate)sulfonic acid.

The polymerization degree of the anionic compound is not particularly limited and it is preferable, for example, that the number of a monomer is 10 to 100000. In terms of solvent solubility and conductivity, the lower limit is preferably 50 and the upper limit is preferably 10000.

The polythiophene complex can be obtained by, for example, oxidation polymerization of a precursor monomer of the polythiophene with the anionic compound, an oxidizing agent, an oxidation catalyst, and a solvent.

Examples of the oxidizing agent and oxidation catalyst include peroxodisulfuric acid salts such as ammonium peroxodisulfate, sodium peroxodisulfate, and potassium peroxodisulfate; transition metal compounds such as ferric chloride, ferric sulfate, ferric nitrate, and cupric chloride: metal halides such as boron trifluoride and aluminum chloride; metal oxides such as silver oxide and cesium oxide; peroxides such as hydrogen peroxide and ozone; organic peroxides such as benzyl peroxide; and oxygen.

The solvent is not particularly limited and examples include polar solvents such as water, N-methyl-2-pyrrolidone, N,N-dimethylformamide, N,N-dimethylacetamide, dimethyl sulfoxide, hexamethylene phosphoryl triamide, acetonitrile, and benzonitrile; phenols such as cresol, phenol, and xylenol; alcohols such as methanol, ethanol, propanol, and butanol; ketones such as acetone and methyl ethyl ketone; carboxylic acids such as formic acid and acetic acid; carbonate compounds such as ethylene carbonate and propylene carbonate; ether compounds such as dioxane and diethyl ether; chain ethers such as ethylene glycol dialkyl ether, propylene glycol dialkyl ether, polyethylene glycol dialkyl ether, and polypropylene glycol dialkyl ether; heterocyclic compounds such as 3-methyl-2-oxazolidinone; and nitrile compounds such as acetonitrile, glutarodinitrile, methoxyacetonitrile, propionitrile, and benzonitrile. These solvents may be used alone or in form of a mixture of two or more of them or by mixing with another organic solvent.

In the oxidation polymerization, the mixing ratio of the precursor monomer of the polythiophene to the anionic compound is not particularly limited. Since a polythiophene complex to be obtained is provided with sufficient conductivity, the mixing ratio is preferably 0.5 to 5 parts by weight of the anionic compound to 1 part by weight of the polythiophene.

A commercially available product can be used as the polythiophene complex and examples include CLEVIOS P (trade name, manufactured by H. C. Stark) and Orgacon (trade name, manufactured by Agfa). Especially, CLEVIOS P (trade name, manufactured by H. C. Stark), which is a complex of poly(3,4-ethylenedioxythiophene) and polystyrenesulfonic acid, is preferable since having good compatibility with a resin.

Many of the complexes obtained by oxidation polymerization and commercially available products are aqueous dispersions. In the present invention, a polythiophene complex in form of an organic solvent dispersion is preferable.

An organic solvent for the polythiophene complex in form of an organic solvent dispersion is not particularly limited as long as the solvent does not dissolve the polythiophene. Examples include alcohols, ketones, ethers, amides, sulfoxides, sulfones, esters, and nitriles.

The alcohols are not particularly limited as long as having a hydroxyl group. Examples include monoalcohols such as methanol, ethanol, propanol, isopropanol, and butanol; dialcohols such as ethylene glycol, propylene glycol, and polypropylene glycol; and polyhydric alcohols such as glycerin and pentaerythritol.

The ketones are not particularly limited as long as having a ketone structure in a molecule. Examples include acetone, methyl ethyl ketone, and methyl isobutyl ketone.

The ethers are not particularly limited and examples include ethers such as diethyl ether, ethyl isopropyl ether, dioxane, tetrahydrofuran, polyethylene glycol dialkyl ethers, and polypropylene glycol dialkyl ethers.

The amides are not particularly limited and examples include dimethylformamide and N-methylpyrrolidone.

The sulfoxides are not particularly limited and examples include dimethyl sulfoxide.

The sulfones are not particularly limited and examples include sulfolane.

The esters are not particularly limited and examples include methyl acetate and ethyl acetate.

The nitriles are not particularly limited and examples include acetonitrile and propionitrile.

These solvents may be used alone or two or more of them may be used in combination.

Especially, alcohols such as ethanol, isopropanol, and ethylene glycol and ketones such as methyl ethyl ketone and methyl isobutyl ketone are preferable in terms of the handling property and dispersion stability.

The content of the polythiophene in the resin layer is preferably 0.1 to 1 parts by weight relative to 100 parts by weight of the solid content of a binder resin, which will be described later. If the content is less than 0.1 parts by weight, it is sometimes impossible to give a desired antistatic property. If the content exceeds 1 part by weight, the light transmittance is decreased and it is sometimes impossible to realize a desired high contrast. The lower limit of the content of the polythiophene is preferably 0.2 parts by weight and the upper limit is preferably 0.7 parts by weight.

Since the optical layered body of the present invention exhibits an antistatic property although the content of the polythiophene is so low, it is assumed that the polythiophene is not dispersed in the entire resin layer but exists in a layer-like state at a certain position in the resin layer or exists in a fine mesh-like state in the resin layer. Herein, the layer-like state is assumed to be a state where the polythiophene exists in a layer-like state while being evenly dispersed at a position where electric communication can be kept and also a state where the polythiophene exists in a layer-like state while localized small portions are at positions so close to one another as to keep electric communication. The fine mesh-like state is assumed to be a state where the polythiophene composes a mesh while molecules of the polythiophene exist adjacently to one another and keep electric communication in the entire resin layer. The polythiophene may exist in the above-mentioned state while being mediated with an auxiliary conductive agent described later in the resin layer.

It is also assumed that the polythiophene exists in the resin layer close to the surface side of the resin layer (opposite to the surface of the light transmitting substrate) but not at a position in the outermost surface for satisfying the light resistance.

The auxiliary conductive agent is a component for assisting the polythiophene to exhibit the antistatic property in the optical layered body of the present invention.

As described above, it is assumed that the polythiophene exists at a position in the resin layer close to the surface of the resin layer but not in the outermost surface. In the case the resin layer contains only the polythiophene, if the existence position is too close to the outermost surface, the resin layer may be deteriorated by ultraviolet rays or oxidation to possibly make the surface resistance in a plane uneven and deteriorate the antistatic property (that is, resin layer may be inferior in the light resistance). On the other hand, if the polythiophene exists at a position where deterioration by ultraviolet rays or deterioration by oxidation is scarcely caused, that is, at a position far from the outermost surface of the resin layer, electric communication to the surface of the resin layer becomes difficult and the surface resistance may possibly become high or uneven in a plane and it also results in inferiority of the antistatic property, if the polythiophene does not exist in a fine mesh-like state evenly in the resin layer, the surface resistance of the resin layer becomes uneven in a plane and the resin layer may possibly become inferior in the antistatic property. Particularly, in the case the resin layer contains only the polythiophene, in order to produce an even and fine mesh-like state of the polythiophene, the addition amount is required to be made large and besides, adequate adjustment is also required in the processing condition.

However, in the present invention, since an auxiliary conductive agent is added to the resin layer in addition to the polythiophene, the problems which may possibly be caused in the case of containing only the polythiophene can be advantageously prevented and the optical layered body is thus excellent in the production stability.

Herein, even if the resin layer contains an auxiliary conductive agent, if the auxiliary conductive agent is evenly dispersed in the whole resin layer in a state of having no electric communication of the agent itself, no electric communication net of the auxiliary conductive agent is formed and thus the antistatic property may become insufficient. If the auxiliary conductive agent in an amount enough to exhibit the sufficient antistatic property is added, the light transmitting property is deteriorated and it may possibly result in impossibility in realizing a desired high contrast. Therefore, it is preferable that the auxiliary conductive agent is dispersed at electrically communicable positions in the resin layer and forms an electric communication net. In the present invention, it is also preferable that an electric communication net is formed by the auxiliary conductive agent and the polythiophene.

The resin layer preferably has a region in which no auxiliary conductive agent exists from the interface on the opposite side to the light transmitting substrate to the depth of 100 nm. Deterioration of the light resistance can be preferably prevented by forming such a region in the defined range where no auxiliary conductive agent exists.

Herein, the above-mentioned "region where no auxiliary conductive agent exists" means a case where no auxiliary conductive agent is observed in a region of 100 nm from the interface opposite to the light transmitting substrate in a SEM image of a cross section of the resin layer, or a case where the number of molecules of the auxiliary conductive agent observed in the area of about 5 µm in the direction perpendicular to the thickness direction of the resin layer is 2 or less in an image magnified 10000 times of a cross section of the resin layer near the interface opposite to the light transmitting substrate.

In the optical layered body of the present invention, it is assumed that the auxiliary conductive agent exists, for example, from the interface in the light transmitting substrate side to immediately under the position where the polythiophene exist in the resin layer (configuration 1); that the auxiliary conductive agent exists at the position same as the position where the polythiophene exists (configuration 2); and that the auxiliary conductive agent exists in a region from the position same as the position where the polythiophene exists to the interface of the resin layer in the light transmitting substrate side (configuration 3).

In the configuration 1, as shown in FIG. 3, it is assumed that a region 32 where the auxiliary conductive agent exists and a region 31 where the polythiophene exists are formed sequentially in layers from the interface of a resin layer 30 in the light transmitting substrate side. In the configuration 1, it is assumed that the auxiliary conductive agent assists the antistatic property of the polythiophene by layering the region 32 where the auxiliary conductive agent exists and the region 31 where the polythiophene exists and forming electric communication between these regions. In FIG. 3, the region 32 where the auxiliary conductive agent exists is formed up to the interface in the light transmitting substrate side; however, it is not necessary that the region 32 where the auxiliary conductive agent exists is formed up to the interface in the light transmitting substrate side.

In the configuration 2, as shown in FIG. 4, it is assumed that a region 41 where the polythiophene and the auxiliary conductive agent exist is formed in a resin layer 40. In the configuration 3, as shown in FIG. 5, it is assumed that a region 51 where the polythiophene and the auxiliary conductive agent exist is formed in a resin layer 50 and a region 52 where the auxiliary conductive agent exists is formed adjacently to the region 51 in the light transmitting substrate side. In the configurations 2 and 3, it is assumed that the polythiophene and the auxiliary conductive agent form an electric communication net in these regions where these materials exist in the resin layer and the auxiliary conductive agent thus assists the antistatic property of the polythiophene.

In FIG. 5, the region 52 where the auxiliary conductive agent exists is formed up to the interface in the light transmitting substrate side; however, it is not necessary that the region 52 where the auxiliary conductive agent exists is formed up to the interface in the light transmitting substrate side.

FIGS. 3 and 4 are cross-sectional views schematically showing the regions where the auxiliary conductive agent and the polythiophene exist in the resin layer in the optical layered body of the present invention.

In the case there are points where the polythiophene is deteriorated by ultraviolet rays or the like, it is assumed that the auxiliary conductive agent exists at the deteriorated points. As a result, it is assumed that the surface resistance value of the resin layer surface is made more excellent and the unevenness in a plane can be reduced and further the light resistance such as ultraviolet resistance and oxidation resistance of the polythiophene can be improved.

As a result, it is assumed that the surface resistance value of the resin layer surface can be made more excellent and the unevenness in a plane can be reduced and further the light resistance such as ultraviolet resistance and oxidation resistance of the polythiophene can be improved.

The "unevenness in a plane" means that the surface resistance value of the resin layer surface is uneven in a plane of the resin layer.

FIG. 1 shows a cross sectional SEM photograph of an optical layered body of the present invention having a resin layer containing chain ATO as the auxiliary conductive agent. Since the addition amount of the polythiophene in the present invention is extremely small, it is presently difficult to observe the polythiophene by observing a cross sectional SEM photograph of the optical layered body of the present invention; however, it is assumed that the polythiophene exists preferably in the resin layer as described above.

As shown in FIG. 1, the existence position of the auxiliary conductive agent such as chain ATO contained in the resin layer can be confirmed by observing the cross section of the resin layer. The optical layered body of the present invention shown in FIG. 1 has a structure in which the resin layer is formed on a rough surface under coat layer containing organic fine particles.

The auxiliary conductive agent is preferably at least one kind selected from the group consisting of chain-like metal oxide particles, carbon nanotubes, and conductive fine particles.

The chain-like metal oxide particles may be metal oxide particles having a structure of being connected in a chain-like form. The chain-like metal oxide particles are chain-like conductive inorganic fine particles having conductivity.

The average particle diameter of metal oxide particles composing the chain-like metal oxide particles is preferably 1 to 100 nm and more preferably 5 nm as the lower limit and 80 nm as the upper limit. If the average particle diameter is smaller than 1 nm, the grain boundary resistance of the metal oxide particles is sharply increased and three-dimensionally agglomerated fine particles tend to increase while scarcely forming the chain-like metal oxide particles, which may sometimes result in impossibility of obtaining a resistance low enough to exhibit the function as an auxiliary conductive agent. On the other hand, if the average particle diameter exceeds 100 nm, formation of the chain-like metal oxide particles becomes difficult and even if the formation is possible, since the contact points of the metal oxide particles are lessened, it may sometimes result in impossibility of obtaining a resistance low enough to exhibit the function as an auxiliary conductive agent. Further, the light absorption by the metal oxide particles is increased and it may sometimes result in decrease of the light transmittance and increase of the haze of the resin layer. For this reason, if the thickness of the resin layer is made small or the amount of the metal oxide particles is reduced to provide the resin layer with constant light transmittance, it may sometimes become impossible to obtain sufficient conductivity as an auxiliary conductive agent.

The average length of the chain-like metal oxide particles is preferably 2 to 200 nm and more preferably 5 nm as the lower limit and 80 nm as the upper limit. If the average length is shorter than 2 nm, the contact resistance of the chain-like metal oxide particles is increased and the antistatic property of the optical layered body of the present invention may sometimes become insufficient. On the other hand, if the average length is longer than 200 nm, the formability of the resin layer is deteriorated and the optical layered body of the present invention may have a problem of optical characteristics such as haze and the appearance may be worsened in some cases.

The average particle diameter and average length of the metal oxide particles are values measured by a scanning electron microscope (JMS 5300, manufactured by JEOL Ltd.).

The chain-like metal oxide particles preferably have an aspect ratio of 2 to 200 in terms of satisfying both of the antistatic property and the light transmittance. If the aspect ratio is lower than 2, the antistatic property of the optical layered body of the present invention cannot be made sufficiently excellent and if it exceeds 200, the light transmittance of the resin layer may sometimes be reduced.

The aspect ratio is a value measured by measuring the longer axis and shorter axis of the chain-like metal oxide particles using a publicly known electron microscope and dividing the length of the longer axis with the length of the shorter axis. The longer axis of the chain-like metal oxide particles means a straight line between two points on the outer circumference of the chain-like metal oxide particles whose distance is the longest and the shorter axis of the chain-like metal oxide particles means a straight line between two points on the outer circumference of the chain-like metal oxide particles whose distance is the longest in a direction perpendicular to the longer axis.

Specific examples of the metal oxide particles composing the chain-like metal oxide particles include metal oxide particles of one or more elements selected from the group consisting of Au, Ag, Pd, Cu, Ni, Ru, Rh, Sn, In, Sb, Fe, Pt, Ti, Cr, Co, Al, Zn, Ta, Pb, Os, and Ir.

Especially, since being capable of more preferably improving the antistatic property of the optical layered body of the present invention, those preferably used as the metal oxide particles are tin oxide, tin oxide doped with Sb, F, or P, indium oxide, indium oxide doped with Sn or F, antimony oxide, and low valence titanium oxide, and particularly, ATO (antimony tin oxide) is preferably used.

The chain-like metal oxide particles can be prepared by, for example, the following method.

That is, first, an alcohol solution containing 0.1 to 5 wt. % of a metal salt or metal alkoxide is hydrolyzed by heating. At this time, if necessary, the solution may be added to hot water or an alkali may be added. The hydrolysis gives a gel dispersion of a metal hydroxide with a primary particle diameter of 1 to 100 nm.

Next, the gel dispersion is filtered and washed and the metal hydroxide is subjected to an autoclave treatment in the presence of an organic stabilizer if necessary and further to a mechanical dispersion treatment. In this case, ionic impurities may be removed by carrying out an ion exchange resin treatment.

The chain-like metal oxide particles obtained in such a manner are taken out of the dispersion generally by centrifugation or the like after the production and washed with an acid or the like if necessary and thereafter used by being dispersed in a polar solvent. The dispersion containing the obtained chain-like metal oxide particles may be used as a coating liquid as it is.

The mechanical dispersion treatment may be performed by, for example, a sand mill method, an impact dispersion method, or the like and particularly, an impact dispersion method is preferably employed. The impact dispersion method is a method of colliding a slurry against a wall at a speed as high as the sound speed for dispersing or crushing and is carried out by using an apparatus such as Artimizer or Nanomizer.

Examples of the organic stabilizer include gelatin, poly(vinyl alcohol), polyvinylpyrrolidone, polycarboxylic acids such as oxalic acid, malonic acid, succinic acid, glutaric acid, adipic acid, sebacic acid, maleic acid, fumaric acid, phthalic acid, and citric acid, and salts thereof, heterocyclic compounds, and mixtures of these compounds.

Examples of the polar solvent include water; alcohols such as methanol, ethanol, propanol, butanol, diacetone alcohol, furfuryl alcohol, tetrahydrofurfuryl alcohol, ethylene glycol, and hexylene glycol; esters such as acetic acid methyl ester and acetic acid ethyl ester; ethers such as diethyl ether, ethylene glycol monomethyl ether, ethylene glycol monoethyl ether, ethylene glycol monobutyl ether, diethylene glycol monomethyl ether, and diethylene glycol monoethyl ether; and ketones such as acetone, methyl ethyl ketone, acetyl acetone, and acetoacetic acid esters. These polar solvents may be used alone or two or more of the solvents may be used in combination.

The carbon nanotubes may be those having a monolayer structure as long as they have a structure in which carbon hexagonal net planes are cylindrically closed, those having a multilayer structure, that is, cylindrical structures are so arranged as to form a multiple nested structure, or a mixture of them.

Specific examples of the carbon nanotubes include single wall carbon nanotubes, double wall carbon nanotubes, and multi-wall carbon nanotubes. Examples of the carbon nanotubes also include those partially entwisted like ropes or those having branched structures. In consideration of the cost, multi-wall carbon nanotubes are preferable.

Carbon nanotubes may be used as they are produced; however, those with improved purity by removing impurities are preferable. Examples of the method known as a purification method of carbon nanotubes include a method of heating the carbon nanotubes in vacuum and a method of subjecting the carbon nanotubes to an acid treatment, and it is also known that an acid treatment produces hydroxyl groups or carboxyl groups in the side chains of carbon nanotubes.

The size of the carbon nanotubes is not particularly limited; however, the fiber length is preferably 100 nm to 100 µm and the fiber diameter is preferably 1 nm to 1 µm. If the fiber length is shorter than 100 nm, the surface resistance value of the resin layer may become uneven in a plane and the antistatic property may sometimes be deteriorated. If the fiber length exceeds 100 µm, the light transmittance may sometimes be reduced. The fiber length is more preferably 1 µm as the lower limit and 10 µm as the upper limit and the fiber diameter is more preferably 200 nm as the upper limit.

The fiber length and fiber diameter of the carbon nanotubes are values measured by electron microscopic observation.

The conductive fine particles may be metal fine particles or metal oxide fine particles. Examples of a material composing the conductive fine particles include tin oxide ($SnO_2$), antimonyl oxide ($Sb_2O_5$), antimony tin oxide (ATO), indium tin oxide (ITO), aluminum zinc oxide (AZO), fluoro-tin oxide (FTO), ZnO, Au, Ag, Cu, Al, Fe, Ni, Pd, and Pt.

The conductive fine particles are preferably spherical and the particle diameter is preferably 0.1 to 200 nm. If the particle diameter is smaller than 0.1 nm, the antistatic property of the present invention may not be sufficiently improved and if it exceeds 200 nm, the transparency (total light transmittance) of the optical layered body of the present invention may sometimes be reduced. A more preferable lower limit is 20 nm and a more preferable upper limit is 150 nm.

In the optical layered body of the present invention, the content of the auxiliary conductive agent may be properly determined in accordance with the kind of the auxiliary conductive agent to be used and in the case the auxiliary conductive agent is chain-like metal oxide particles and/or conductive fine particles, it is preferably 0.5 to 5.0 parts by weight relative to 100 parts by weight of the binder resin. If the content is less than 0.5 parts by weight, the antistatic property of the optical layered body of the present invention may sometimes become insufficient and if it exceeds 5.0 parts by weight, the light transmittance of the optical layered body of the present invention may sometimes be reduced and the contrast may be reduced. The content is more preferably 0.5 to 2.5 parts by weight. The antistatic property of the optical layered body of the present invention can be improved more preferably if the content of the auxiliary conductive agent is within the above-mentioned range.

If the auxiliary conductive agent is carbon nanotubes, the content of the auxiliary conductive agent is preferably 0.001 to 0.13 parts by weight relative to 100 parts by weight of the binder resin. If the content is less than 0.001 parts by weight, the antistatic property of the optical layered body of the present invention may sometimes become insufficient and if it exceeds 0.13 parts by weight, the light transmittance may sometimes be reduced and the contrast may be reduced. A more preferable lower limit is 0.005 parts by weight and a more preferable upper limit is 0.05 parts by weight. The antistatic property of the optical layered body of the present invention can be improved more preferably if the content of the auxiliary conductive agent is within the above-mentioned range.

In the optical layered body of the present invention, the binder resin is not particularly limited as long as it is a material which does not react on the anionic compound and it preferably contains a hydrophobic resin. If the binder resin contains a hydrophobic resin, the optical layered body is provided with an excellent antistatic property and high contrast.

In this description, the "hydrophobic resin" means an acrylic acid ester resin containing no hydrophilic functional group such as a hydroxyl group, an amino group, a carboxyl group, or a sulfo group but contains a hydrophobic functional group such as a vinyl group, a urethane group, or a (meth) acryloyl group.

In the optical layered body of the present invention, a resin which reacts on an anionic compound cannot be used as the binder resin since the resin deteriorates the function of the antistatic property.

As the hydrophobic resin, especially urethane acrylate is preferably usable since being suitable for providing an excellent antistatic property and high contrast and at the same time providing desirable hard coatability.

In the optical layered body of the present invention, if the binder resin is used in combination with the urethane acrylate, the binder resin preferably contains a hydrophobic resin other than the urethane acrylate. If the hydrophobic resin is further added, it is made possible to make the polythiophene unevenly exist near the surface (the surface in the opposite side to the light transmitting substrate) in the resin layer and even if the addition amount of the polythiophene is small, an excellent antistatic property can be provided. The reason for this is not necessarily apparent, but it is supposed that existence of a large amount of hydrophobic resins with low polarity in the resin layer makes localization of the polythiophene with high polarity in the near the surface easy.

Specifically, preferable examples of the hydrophobic resin other than urethane acrylate include (meth)acrylic esters such as pentaerythritol tetra(meth)acrylate, trimethylol propane tri(meth)acrylate, and dipentaerythritol hexa(meth)acrylate, and ethylene oxide-modified compounds of these.

Pentaerythritol tetra(meth)acrylate is especially preferably used among them.

A hydrophobic resin with high polarity sometimes deteriorates the initial antistatic property and for example, pentaerythritol tri(meth)acrylate is unsuitable.

The content of a hydrophobic resin in the binder resin is preferably 20 to 100 wt. % in the resin components of the binder resin. If the content is less than 20 wt. %, the antistatic property of the optical layered body of the present invention may be deteriorated. The content of the hydrophobic resin is more preferably 25 wt. % as the lower limit and 70 wt. % as the upper limit.

The binder resin other than the hydrophobic resin may contain an ionizing radiation-hardenable resin which is hardened by ultraviolet rays or an electron beam, a mixture of an ionizing radiation-hardenable resin and a solvent drying resin (a resin that forms a coating film only by drying out the solvent added for adjusting the solid content at the time of application), or a thermosetting resin. Especially, an ionizing radiation-hardenable resin is preferable.

Examples of the ionizing radiation-hardenable resin include compounds having one or more unsaturated bonds such as compounds having acrylate functional groups. Examples of a compound having one unsaturated bond include ethyl (meth)acrylate, ethylhexyl(meth)acrylate, styrene, methylstyrene, and N-vinylpyrrolidone. Examples of a compound having two or more unsaturated bonds include reaction products of polyfunctional compounds and (meth)acrylate (e.g., polyhydric alcohol poly(meth)acrylate esters) such as polymethylolpropane tri(meth)acrylate, hexanediol di(meth)acrylate, tripropylene glycol di(meth)acrylate, diethylene glycol di(meth)acrylate, pentaerythritol tri(meth)acrylate, dipentaerythritol hexa(meth)acrylate, 1,6-hexanediol di(meth)acrylate, and neopentyl glycol di(meth)acrylate.

Other than the above-mentioned compounds, those also usable as the ionizing radiation-hardenable resin are polyester resins having an unsaturated double bond and a relatively low molecular weight, polyether resins, acrylic resins, epoxy resins, alkyd resins, spiroacetal resins, polybutadiene resins, and polythiol-polyene resins.

A solvent drying resin to be used by mixing with the ionizing radiation-hardenable resin may be mainly a thermoplastic resin.

Addition of a solvent drying resin can effectively prevent a coating film defect of a coating surface.

Specific and preferable examples of the thermoplastic resin include styrene resins, (meth)acrylic resins, vinyl acetate resins, vinyl ether resins, halogen-containing resins, alicyclic olefin resins, polycarbonate resins, polyester resins, polyamide resins, cellulose derivatives, silicone resins, and rubber or elastomers.

Generally, it is particularly preferable to use a resin which is noncrystalline and soluble in an organic solvent (especially, a common solvent capable of dissolving a plurality of polymers and hardenable compounds) as the thermoplastic resin. Especially, a resin with high moldability or film-formability, transparency, and weather resistance, for example, styrene resins, (meth)acrylic resins, alicyclic olefin resins, polyester resins, and cellulose derivatives (cellulose esters) are preferable.

Examples of the thermosetting resin include phenol resins, urea resins, diallyl phthalate resins, melamine resins, guanamine resins, unsaturated polyester resins, polyurethane resins, epoxy resins, aminoalkyd resins, melamine-urea co-condensed resins, silicon resins, and polysiloxane resins.

The resin layer contains a leveling agent.

If the leveling agent is contained, the leveling agent bleeds to the surface of the resin layer and therefore, in forming the resin layer using a resin layer composition described later, defects such as uneven convection in the resin layer composition or a Benard cell at the time of application and drying can be prevented. Because of positive bleeding of the leveling agent to the resin layer surface, bleeding of the polythiophene to the resin layer surface can be prevented and it is assumed to be made possible that the polythiophene can exist in a layer-like state at a certain position in the resin layer, or exist in a fine mesh-like state in the resin layer, or exist at a position close to the resin layer surface in the resin layer but not in the outermost surface to provide a stable and desirable antistatic property.

The leveling agent is not particularly limited regardless of whether it is reactive or non-reactive as long as it is a material which does not react on the anionic compound of the polythiophene and is preferably a fluoro and/or silicon compound.

The fluorine compound preferably has a perfluoroalkyl group represented by $C_dF_{2d+1}$ (d is an integer of 1 to 21), a perfluoroalkylene group represented by $—(CF_2CF_2)_g—$ (g is an integer of 1 to 50), or a perfluoroalkyl ether group represented by $F—(—CF(CF_3)CF_2O—)_e—CF(CF_3)$ (e is an integer of 1 to 50) in combination with a perfluoroalkenyl group such as $CF_2=CFCF_2CF_2—$, $(CF_3)_2C=C(C_2F_5)—$, or $((CF_3)_2CF)_2C=C(CF_3)—$.

If the fluorine compound is a compound having the above-mentioned functional groups, the structure of the fluorine compound is not particularly limited and a fluorine-containing polymer or a copolymer of a fluorine-containing monomer and a fluorine-free monomer can also be usable. A fluorine compound particularly preferably used is a block copolymer or a graft copolymer consisting of a fluorine-containing polymer segment composed of either of a homopolymer of a fluorine-containing monomer, or a copolymer of a fluorine-containing monomer and a fluorine-free monomer, and a fluorine-free polymer segment. In such a copolymer, the fluorine-containing polymer segment has a function of improving mainly a stain-proofing property, a water- and oil-repelling property and on the other hand, the fluorine-free polymer segment has an anchor function of improving the compatibility with the binder component. Accordingly, in a reflection-preventing laminated body using such a copolymer, even if the surface is repeatedly scrubbed, the fluorine compound is hardly removed and the laminated body keeps these properties such as the stain-proofing property for a long duration.

The fluorine compound is available as a commercially available product and for example, Modiper F series produced by NOF Corporation and Megafac series produced by DIC Inc. are preferably used.

The silicon compound preferably has a structure represented by the following formula:

[Chem. 1]

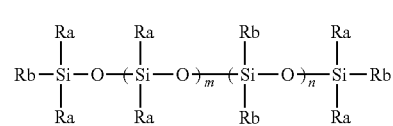

wherein Ra is a $C_{1-20}$ alkyl group such as a methyl group; Rb is a $C_{1-20}$ alkyl group unsubstituted or substituted with an amino group, an epoxy group, a carboxyl group, a hydroxyl group, a perfluoroalkyl group, a perfluoroalkylene group, a perfluoroalkyl ether group, a or (meth)acryloyl group, a $C_{1-3}$ alkoxy group, or a polyether-modified group; Ra and Rb may be same or different; and m and n are respectively an integer of 0 to 200).

Polydimethylsilicone having a basic skeleton as shown in the above-mentioned formula is generally known to have low surface tension and be excellent in a water-repelling property and a mold release property and can be provided with another effect by introducing various kinds of functional groups into side chains or terminals. For example, introduction of an amino group, an epoxy group, a carboxyl group, a hydroxyl group, a (meth)acryloyl group, an alkoxy group, or the like can provide reactivity and a chemical reaction with the above-mentioned ionizing radiation-hardenable resin composition can form a covalent bond. Further, introduction of a perfluoroalkyl group, a perfluoroalkylene group, or a perfluoroalkyl ether group can provide oil resistance, a lubricating property and the like and introduction of a polyether-modified group can improve the leveling property and the lubricating property.

Such a compound is available as commercially available products and various kinds of modified silicone oils suitable for the purposes, for example, Silicone Oil FL 100 having a fluoroalkyl group (produced by Shin-Etsu Chemical Co., Ltd) and Polyether-modified Silicone Oil TSF 4460 (trade name, produced by Momentive Performance Materials, Japan) are available. Especially, TSF 4460 is preferably used in the present invention.

The fluorine and/or silicon compound may be a compound having a structure represented by the following formula:

$$Ra_nSiX_{4-n}$$

wherein Ra is a $C_{3-1000}$ hydrocarbon group including a perfluoroalkyl group, a perfluoroalkylene group, or a perfluoroalkyl ether group; X is a hydrolyzable group, for example, a $C_{1-3}$ alkoxy group such as a methoxy group, an ethoxy group, or a propoxy group, an oxyalkoxy group such as a methoxymethoxy group or a methoxyethoxy group, or a halogen group such as a chloro group, a bromo group, or an iodo group; all may be same or different; and n is an integer of 1 to 3).

The hydrolyzable group makes formation of a covalent bond or a hydrogen bond with a hydroxyl group of particularly the inorganic component, the silica component in the present invention, easy and is effective to keep the adhesiveness.

Fluoroalkylsilane such as TSL 8257 (produced by GE Toshiba Silicone) is a specific example of such a compound.

The content of the leveling agent in the resin layer is preferably 0.01 to 5 parts by weight relative to 100 parts by weight of the binder resin. If the content is less than 0.01 parts by weight, it may result in defects such as uneven convection at the time of drying a coating film or poor appearance of the coating surface due to leveling insufficiency and therefore, it is not preferable. If the content exceeds 5 parts by weight, it may result in defects such as decrease of hardness of the coating film and therefore, it is also not preferable. The content of the leveling agent is more preferably 0.1 parts by weight as the lower limit and 2 parts by weight as the upper limit.

The resin layer preferably further contains an additive having a protonic functional group.

Addition of the additive having a protonic functional group improves dispersibility and stability of the polythiophene and makes the optical layered body excellent in the antistatic property. This is supposedly attributed to that the additive having a protonic functional group can act like the above-mentioned anionic compound. Addition of the additive having a protonic functional group is preferable since the light resistance also is more stabilized.

Examples of the additive having a protonic functional group include epoxy acrylate, hydroxyacrylate, and vinyl sulfonic acid. Especially, epoxy acrylate is preferable.

The content of the additive having a protonic functional group in the resin layer is preferably 1 to 15 parts by weight relative to 100 parts by weight of the binder resin. If the content is less than 1 part by weight, the polythiophene may possibly be agglomerated and precipitated and additionally, the antistatic property may sometimes be deteriorated and the stable production may become difficult. If the content exceeds 15 parts by weight, the polythiophene may possibly be dispersed excessively and in this case, the antistatic property may be deteriorated. The content of the additive having a protonic functional group is more preferably 2 parts by weight as the lower limit and 1.0 parts by weight as the upper limit.

The epoxy acrylate or the like, which is the additive having a protonic functional group, exhibits hard coatability by causing a crosslinking reaction and functions also as a binder resin. In this case, the content of the epoxy acrylate or the like is preferably 1 to 15 wt. % in 100 wt. % of the binder resin containing the epoxy acrylate or the like.

In the optical layered body of the present invention, the resin layer preferably has an antiglare function.

The resin layer having an antiglare function preferably has an uneven surface shape. The uneven shape preferably has Sm, θa, Ra, and Rz as those of an antiglare layer described later.

The uneven shape of the surface of the resin layer having an antiglare function may be formed by using a resin layer composition containing an antiglare agent, by phase separation of the binder resin, or by embossing process. Examples of the antiglare agent are same as those of an antiglare agent described in the antiglare layer later.

The resin layer having the above-mentioned composition can be formed by using a resin layer composition prepared by evenly mixing the binder resin, the polythiophene, the auxiliary conductive agent, the leveling agent, and if necessary the resin having a protonic functional group and other components in a solvent.

The mixing may be carried out with a publicly known apparatus such as a paint shaker, a bead mill, or a kneader.

The resin layer composition may further contain a photopolymerization initiator.

Examples of the photopolymerization initiator include acetophenones (e.g., trade name, Irgacure 184, 1-hydroxycyclohexyl-phenyl-ketone produced by Ciba (Japan) Ltd.; and trade name, Irgacure 907, 2-methyl-1[4-(methylthio)phenyl]-2-morpholinopropan-1-one, produced by Ciba (Japan) Ltd.), benzophenones, thioxanthones, benzoin, benzoin methyl ether, aromatic diazonium salts, aromatic sulfonium salts, aromatic iodonium salts, metallocene compounds, and benzoin sulfonic acid esters. These compounds may be used alone or two or more of them may be used in combination.

The addition amount of the photopolymerization initiator is preferably 0.1 to 10 parts by weight relative to 100 parts by weight of the solid content of the binder resin.

The resin layer composition may further contain other components if necessary. Examples of other components include an ultraviolet absorber, a stain-proofing agent, a refractive index adjustment agent, an antioxidant, a radical scavenger, a crosslinking agent, a hardening agent, a polymerization promoter, a polymerization inhibitor, and a viscosity adjustment agent.

Examples of the solvent include alcohols (e.g., methanol, ethanol, propanol, isopropanol, n-butanol, sec-butanol, tert-butanol, benzyl alcohol, PGME, and ethylene glycol), ketones (e.g., acetone, methyl ethyl ketone, methyl isobutyl ketone, cyclopentanone, cyclohexanone, heptanone, diisobutyl ketone, and diethyl ketone), aliphatic hydrocarbons (e.g., hexane and cyclohexane), halogenated hydrocarbons (e.g., methylene chloride, chloroform, and tetrachloromethane), aromatic hydrocarbons (e.g., benzene, toluene, and xylene), amides (e.g., dimethylformamide, dimethylacetamide, and n-methylpyrrolidone), ethers (e.g., diethyl ether, dioxane, and tetrahydrofuran), and ether alcohols (e.g., 1-methoxy-2-propanol). Especially, ethanol, isopropanol, n-butanol, ethylene glycol, and methyl isobutyl ketone are preferable.

One kind or a plurality of kinds of these solvents may be used and especially, it is preferable that the entire solvent contains 5 to 70% of two or more kinds of alcohol solvents with different boiling points, and it is more preferable that the entire solvent contains 15 to 60% of them. If the alcohol solvents are contained in the above-mentioned range, the antistatic property can be stably obtained.

A method of forming the resin layer may be a method of forming the resin layer by applying the resin layer composition to form a coating film, drying the coating film if necessary, and thereafter hardening the coating film.

As a method of forming a coating film by application, various publicly known methods such as a spin coating method, a dipping method, a spraying method, a die coating method, a bar coating method, a roll coater method, a meniscus coater method, a flexo printing method, a screen printing method, and a bead coater method can be mentioned.

A method of drying may be a method of drying the composition at 30 to 120° C. for 3 to 120 seconds.

A hardening method for the coating film may be selected properly in accordance with the contents of the composition and the like. If the composition is an ultraviolet hardenable one, the coating film may be hardened by irradiation with ultraviolet rays.

In irradiation of ultraviolet rays, a method of radiating 10 to 300 $mJ/cm^2$ of ultraviolet rays may be employed.

The thickness of the resin layer is preferably 0.6 to 10 μm. If the thickness is smaller than 0.6 μm, the hardness of the coating film may possibly be insufficient. If the thickness is larger than 10 μm, uneven convection in the coating film formed by applying the resin layer composition cannot be suppressed sufficiently and it may possibly result in impossibility of obtaining an optical layered body excellent in the antistatic property. The thickness is more preferably 1 to 9 μm. The thickness of the resin layer is a value measured by observing a cross section of the optical layered body with an electron microscope (SEM, TEM, or STEM).

The optical layered body of the present invention has a light transmitting substrate.

Those having smoothness and heat resistance and excellent in mechanical strength are preferable as the light transmitting substrate.

Specific examples of a material forming the light transmitting substrate include thermoplastic resins such as poly(ethylene terephthalate) (PET), poly(ethylene naphthalate), poly(butylene terephthalate), poly(butylene naphthalate), triacetyl cellulose (TAC), cellulose diacetate, cellulose acetate butylate, polyamides, polyimides, polyethersulfones, polysulfones, polypropylene (PP), cycloolefin polymers (COP), cycloolefin copolymers (COC), polymethylpentene, poly(vinyl chloride), poly(vinyl acetal), polyether ketones, poly(methyl methacrylate), polycarbonates, and polyurethanes. Poly(ethylene terephthalate) or triacetyl cellulose is preferable.

The thickness of the light transmitting substrate is preferably 20 to 300 μm and more preferably 30 μm as the lower limit and 200 μm as the upper limit.

In order to improve the adhesiveness to a layer to be formed thereon, the light transmitting substrate may be subjected previously to a physical treatment such as a corona discharge treatment, saponification, or an oxidation treatment, or application of an anchor agent or a coating agent such as a primer.

Since having the above-mentioned resin layer formed on the light transmitting substrate, the optical layered body of the present invention can stably keep light resistance such as ultraviolet resistance and oxidation resistance while keeping conventional physical properties and optical properties as an outermost surface material of an image display device, is excellent in an antistatic property and is capable of providing high image contrast when employed for an image display device. In the optical layered body of the present invention, the resin layer preferably has a function such as an antiglare property and hard coatability. The resin layer may be composed of a single layer or may have a multilayer structure.

The optical layered body of the present invention preferably has an antiglare function. The configuration of the optical layered body of the present invention having an antiglare function may be, for example, a configuration in which the resin layer has the antiglare function; or a configuration in which a rough surface under coat layer having an uneven shape is formed on the light transmitting substrate and the resin layer is formed on the rough surface under coat layer.

Having the antiglare function, the optical layered body of the present invention can prevent reflection of light from outside and improve the visibility.

The optical layered body of the present invention preferably has a configuration of further having a rough surface under coat layer on the light transmitting substrate and the resin layer on the rough surface under coat layer. In the case the antiglare function is provided by a method of, for example, mixing fine particles for formation of the uneven shape with the resin layer, the effect of the present invention owing to the resin layer may possibly be lost depending on the existence state of the fine particles for formation of the uneven shape or adequate processing conditions may possibly be required. However, if the resin layer is provided on the rough surface under coat layer, the optical layered body of the present invention is provided with a proper antiglare function without losing the effect of the present invention caused by the resin layer.

Conventionally, in an optical layered body with a configuration in which an antistatic layer containing an antistatic agent is formed on the surface of an antiglare layer having an uneven shape on the surface, it is difficult to satisfy the antiglare property owing to the antiglare layer, the antistatic property owing to the antistatic layer, and the light transmitting property which the optical layered body is intrinsically required to have. However, the optical layered body of the present invention can sufficiently satisfy these properties since it has a desired resin layer on the rough surface under coat layer having the uneven shape as described.

The configuration in which the resin layer has the antiglare function and the configuration in which a rough surface under coat layer having an uneven shape is formed on the light transmitting substrate and the resin layer is formed on the rough surface under coat layer both mean a layer having an uneven shape on the surface (hereinafter, the layers having both the configurations may be collectively referred to as an antiglare layer). The uneven shape preferably satisfies the following expression in which the average interval of the projections and recesses of the antiglare layer surface is expressed as Sm; the average slanting angle of the uneven part is expressed as θa; the arithmetic mean roughness of the unevenness is expressed as Ra; and the ten point average roughness of the unevenness is expressed as Rz, in terms of prevention of the reflection of the light from outside. If θa, Ra, and Rz are less than their lower limits, reflection of light from outside cannot be suppressed. If θa, Ra, and Rz exceed their upper limits, it may result in an undesirable consequence such as scintillation. If Sm is smaller than its lower limit, white muddiness may possibly be caused. If Sm exceeds its upper limit, it may result in an undesirable consequence that the reflection of light from outside cannot be suppressed.

$$50\ \mu m < Sm < 600\ \mu m$$

$$0.1° < \theta a < 1.5°$$

$$0.02\ \mu m < Ra < 0.25\ \mu m$$

$$0.30\ \mu m < Rz < 2.00\ \mu m$$

The uneven shape of the antiglare layer is more preferably satisfies the following expression. If the following expression is satisfied, the reflection of light from outside can be prevented and it is made possible to give excellent glossy blackness (reproducibility of wet look glossy black color in image display) in the state of black display with an image display device and it is therefore more preferable. If θa, Ra, Rz and Sm exceed their upper limits or smaller than their lower limits, it may become impossible to give glossy blackness.

$$100\ \mu m < Sm < 400\ \mu m$$

$$0.1° < \theta a < 1.2°$$

$$0.02\ \mu m < Ra < 0.15\ \mu m$$

$$0.30\ \mu m < Rz < 1.20\ \mu m$$

In this description, Sm, Ra, and Rz are values measured by methods according to JIS B 0601-1994; θa is a value obtained according to the definition in the manual instruction of a surface roughness measurement apparatus: SE-3400 (revised on Jul. 20, 1995) (Kosaka Laboratory Ltd.) and calculated as arc tangent $\{\theta a = \tan^{-1}(h_1+h_2+h_3+ \ldots +h_n)/L\}$ of the total of the height of the projections existing in a standard length L $(h_1+h_2+h_3+ \ldots +h_n)$ as shown in FIG. 2.

Sm, θa, Ra, and Rz can be calculated by using, for example, the surface roughness measurement apparatus: SE-3400 manufactured by Kosaka Laboratory Ltd.

The uneven shape of the antiglare layer may be formed by using a composition containing an antiglare agent, by phase separation of a resin, or by embossing process.

The uneven shape of the antiglare layer is more preferably formed by using a composition containing an antiglare agent. In the case the antiglare layer is a resin layer having an uneven shape, the composition containing the antiglare agent is the resin layer composition containing the antiglare agent and is for forming the resin layer having an uneven shape. On the other hand, if the antiglare layer has a configuration in which the resin layer is formed on a rough surface under coat layer, the composition containing an antiglare agent is for forming the rough surface under coat layer.

The antiglare agent is fine particles and the shape may be truly spherical, elliptical, or amorphous, and the like and is not particularly limited. Inorganic or organic fine particles may be used as the antiglare agent and transparent fine particles are preferably used.

Specific examples of the organic fine particles include plastic beads. Examples of the plastic beads include polystyrene beads (refractive index 1.59 to 1.60), melamine beads (refractive index 1.57), acrylic beads (refractive index 1.49 to 1.53), acrylic-styrene copolymer beads (refractive index 1.54 to 1.58), benzoguanamine-formaldehyde condensate beads (refractive index 1.66), melamine-formaldehyde condensates (refractive index 1.66), polycarbonate beads (refractive index 1.57), and polyethylene beads (refractive index 1.50). The plastic beads preferably have a hydrophobic group in their surfaces and for example, polystyrene beads are preferable.

Examples of the inorganic fine particles include amorphous silica and inorganic silica beads having a specified shape such as a spherical shape.

Especially, it is preferable to use acrylic-styrene copolymer beads and/or amorphous silica as the antiglare agent.

The average particle diameter of the antiglare agent is preferably 1 to 10 μm and more preferably 3 to 8 μm. The average particle diameter is a value measured by using a laser diffraction scattering particle size analyzer in a dispersion state in 5 wt. % of toluene.

The content of the antiglare agent is preferably 1 to 40 parts by weight and more preferably 5 to 30 parts by weight relative to 100 parts by weight of the solid content of the binder resin.

The antiglare layer preferably further contains internally scattered particles. The internally scattered particles are those which can provide internal haze and suppress scintillation and the like.

The internally scattered particles may be organic particles or inorganic particles with a relatively large difference of refractive index from that of the binder resin composing the antiglare layer and examples include plastic beads such as acrylic-styrene copolymer beads (refractive index 1.54 to 1.58), melamine beads (refractive index 1.57), polystyrene beads (refractive index 1.59 to 1.60), poly(vinyl chloride) beads (refractive index 1.60), benzoguanamine-formaldehyde condensate beads (refractive index 1.66), and melamine-formaldehyde condensates (refractive index 1.66), and silicone particles (refractive index 1.42).

These particles may be those having properties as the antiglare agent and properties as the internally scattered particles.

The average particle diameter of the internally scattered particles is preferably 0.5 to 10 μm and more preferably 1 to 8 μm. The average particle diameter is a value measured by using a laser diffraction scattering particle size analyzer in a dispersion state in 5 wt. % of toluene.

The addition amount of the internally scattered particles is preferably 0.1 to 40 wt. % and more preferably 1 to 30 parts wt. % relative to 100 parts by weight of the solid content of the binder resin.

Those usable as a binder resin of the antiglare layer may be the same as those usable as the binder resin of the resin layer.

The antiglare layer may further contain other components if necessary to an extent that the effect of the invention is not damaged. Those usable as other components may be the same as other components usable for the above-mentioned resin layer.

The antiglare layer may be formed by a publicly known method. For example, a composition for an antiglare layer is prepared by mixing and dispersing a binder resin, an antiglare agent, other components and a solvent by a publicly known method. Those applicable as the method for preparing the composition for an antiglare layer and the method of forming the antiglare layer using the composition may be the same as those applicable as the method for preparing the resin layer composition and the method of forming the resin layer, respectively.

The thickness of the antiglare layer is preferably 1 to 10 μm. If the thickness is smaller than 1 μm, the antiglare property may not be provided sufficiently. If it is larger than 10 μm, curls or cracks may possibly be formed.

The thickness of the layer is a value measured by observing a cross section of the optical layered body with an electron microscope (SEM, TEM, STEM).

The optical layered body of the present invention preferably has a low refractive index layer on the resin layer since the antireflection property can be improved.

The low refractive index layer is a layer playing a role of reducing the reflectance when the light from outside (e.g., a fluorescent lamp or natural light) is reflected on the surface of the optical layered body. The low refractive index layer is preferably a thin film containing any of 1) a resin containing silica or magnesium fluoride; 2) a fluorine resin, which is a low refractive index resin; 3) a fluorine resin containing silica or magnesium fluoride; and 4) silica or magnesium fluoride. Resins similar to the resins for composing the resin layer can be used, except the fluorine resins.

The silica is preferably hollow silica fine particles and such hollow silica fine particles can be produced by, for example, a production method described in Examples of Japanese Kokai Publication 2005-099778.

The low refractive index layer preferably has a refractive index of 1.45 or lower, more preferably 1.42 or lower.

The thickness of the low refractive index layer is not particularly limited and in general, it may be set properly in a range of about 30 nm to 1 μm.

Although the low refractive index layer with a monolayer structure is effective, it is also adequate to form 2 or more low refractive index layers in order to further reduce the minimum reflectance or further increase the minimum reflectance. In the case of forming 2 or more low refractive index layers, it is preferable to make the refractive index and thickness of the respective low refractive index layers different.

Examples of the fluorine resin include polymerizable compounds containing fluorine atoms at least in molecules and polymers thereof. The polymerizable compounds are not particularly limited, and those having a functional group hardenable by ionizing radiation or a hardening-reactive group such as a thermosetting polar group are preferable. Compounds having these reactive groups together are also preferable. In contrast to the polymerizable compounds, polymers are those having no reactive group as described above.

Those widely usable as the polymerizable compounds having a functional group hardenable by ionizing radiation may be fluorine-containing monomers having an ethylenically unsaturated bond. More specifically, examples include fluoroolefins (e.g., fluoroethylene, vinylidene fluoride, tetrafluoroethylene, hexafluoropropylene, perfluorobutadiene, and perfluoro-2,2-dimethyl-1,3-dioxole). Those having a (meth) acryloyloxy group may be (meth)acrylate compounds having a fluorine atom in the molecule such as 2,2,2-trifluoroethyl (meth)acrylate, 2,2,3,3,3-pentafluoropropyl(meth)acrylate, 2-(perfluorobutyl)ethyl (meth)acrylate, 2-(perfluorohexyl) ethyl (meth)acrylate, 2-(perfluorooctyl)ethyl (meth)acrylate, 2-(perfluorodecyl)ethyl (meth)acrylate, methyl α-trifluoromethacrylate, and ethyl α-trifluoromethacrylate; and fluorine-containing polyfunctional (meth)acrylic acid ester compounds having a $C_{1-14}$ fluoroalkyl group, a fluorocycloalkyl group, or a fluoroalkylene group containing at least 3 fluorine atoms and also at least 2 (meth)acryloyloxy groups in the molecule.

Those preferable as the thermosetting polar group are, for example, groups forming hydrogen bonds such as a hydroxyl group, a carboxyl group, an amino group, and an epoxy group. These compounds are excellent not only in the adhesiveness to a coating film but also in the compatibility with inorganic ultrafine particles of silica or the like. Examples of the polymerizable compound having a thermosetting polar group include a 4-fluoroethylene-perfluoroalkyl vinyl ether copolymer; a fluoroethylene-hydrocarbon vinyl ether copolymer; and fluorine-modified products of epoxy, polyurethane, cellulose, phenol, and polyimide resins.

Examples of the polymerizable compounds having a functional group hardenable by ionizing radiation and a thermosetting polar group include partially or completely fluorinated alkyl acrylate or alkyl methacrylate; alkenyl and aryl esters; completely or partially fluorinated vinyl ethers; completely or partially fluorinated vinyl esters; and completely or partially fluorinated vinyl ketones.

Examples of the fluorine resin are as follows.

Polymers of monomers or monomer mixtures containing at least one kind of fluorine-containing (meth)acrylate compounds among the polymerizable compounds having an ionizing radiation hardenable group; copolymers of at least one kind of compound among the fluorine-containing (meth) acrylate compounds and (meth)acrylate compounds containing no fluorine atom in the molecule such as methyl (meth) acrylate, ethyl (meth)acrylate, propyl(meth)acrylate, butyl (meth)acrylate, and 2-ethylhexyl(meth)acrylate; and homo- or copolymers of fluorine-containing monomers such as fluoroethylene, vinylidene fluoride, trifluoroethylene, chlorotrifluoroethylene, 3,3,3-trifluoropropylene, 1,1,2-trichloro-3,3, 3-trifluoropropylene, and hexafluoropropylene. Silicone-containing vinylidene fluoride copolymers obtained by adding a silicone component to these copolymers are also usable. Examples of the silicone component in this case include (poly)dimethylsiloxane, (poly)diethylsiloxane, (poly)diphenylsiloxane, (poly)methylphenylsiloxane, alkyl-modified (poly)dimethylsiloxane, azo group-containing (poly)dimethylsiloxane, dimethylsilicone, phenyl methyl silicone, alkyl-aralkyl-modified silicone, fluorosilicone, polyether-modified silicone, fatty acid ester-modified silicone, methyl hydrogen silicone, silanol group-containing silicone, alkoxy group-containing silicone, phenol group-containing silicone, methacryl-modified silicone, acryl-modified silicone, amino-modified silicone, carboxylic acid-modified silicone, carbinol-modified silicone, epoxy-modified silicone, mercapto-modified silicone, fluorine-modified silicone, and polyether-modified silicone. Especially, those having a dimethylsiloxane structure are preferable.

Further, non-polymers or polymers of the following compounds are also usable as the fluorine resin. That is, compounds obtained by reaction of fluorine-containing compounds having at least one isocyanato group in the molecule with compounds having at least one functional group reactive on the isocyanato group such as an amino group, a hydroxyl group, and a carboxyl group in the molecule; and compounds obtained by reaction of fluorine-containing polyols such as fluorine-containing polyether polyols, fluorine-containing alkyl polyols, fluorine-containing polyester polyols, fluorine-containing and ε-caprolactone-modified polyols with compounds having an isocyanato group.

Resin components as described above for the resin layer may also be used together with the fluorine atom-containing polymerizable compounds and polymers in the form of a mixture. A hardening agent for hardening the reactive groups or the like, and various kinds of additives and solvents for improving the coatability and providing a stain-proofing property may be properly used.

In the case of forming the low refractive index layer, it is preferable that the viscosity of the composition for a low refractive index layer obtained by adding the low refractive index agent and resins is adjusted to be in a range of preferably 0.5 to 5 mPa·s (25° C.) and more preferably 0.7 to 3 mPa·s (25° C.) in which desirable coatability can be obtained. An antireflection layer excellent in the visible light reflection can be realized and a uniform thin film with no coating unevenness can be formed and thus a low refractive index layer excellent particularly in the adhesiveness can be formed.

The hardening means of the resin may be the same as that described in the above-mentioned resin layer. In the case a heating means is used for the hardening treatment, it is preferable to add a heat polymerization initiator for starting the polymerization of the polymerizable compound by heating to generate radicals to the fluorine resin composition.

The thickness (nm) $d_A$ of the low refractive index layer preferably satisfies the following expression (1):

$$d_A = m\lambda/(4n_A) \quad (1)$$

wherein $n_A$ denotes the refractive index of the low refractive index layer;

m denotes a positive odd integer and is preferably 1;

$\lambda$ denotes the wavelength and is preferable a value in a range of 480 to 580 nm).

In the present invention, the low refractive index layer preferably satisfies the following expression (2):

$$120 < n_A d_A < 145 \quad (2)$$

in terms of decrease of the refractive index.

The optical layered body of the present invention may have other arbitrary layers besides the light transmitting substrate, the resin layer, and the antiglare layer. Examples of the arbitrary layers include a stain-proofing layer, a high refractive index layer, and a middle refractive index layer. These layers may be formed by mixing a publicly known high refractive index agent and a stain-proofing agent with a resin, a solvent and the like and forming a layer by a publicly known method.

The optical layered body of the present invention preferably has a hardness of 2H or higher in a pencil hardness test (load 4.9 N) according to JIS K5600-5-4 (1999).

The optical layered body of the present invention preferably has a surface resistance value of the resin layer (the initial value immediately after production) less than $1\times10^{12}\Omega/\square$. If the surface resistance value is $1\times10^{12}\Omega/\square$ or more, the intended antistatic function may not be exhibited. The surface resistance value is more preferably less than $1\times10^{11}\Omega/\square$ and furthermore preferably less than $1\times10^{10}\Omega/\square$.

The surface resistance value can be measured by a surface resistance measurement apparatus (product number: Hizesta UP MCP-HT 260, manufactured by Mitsubishi Chemical Corporation) using a UR probe and the application voltage was set at 500 V.

The optical layered body of the present invention also preferably has an initial surface resistance value of the outermost surface less than $1\times10^{12}\Omega/\square$ after 100 hours from a light resistance test (Fade-OMeter, FAL-AU-B, manufactured by Suga Test Instruments Co., Ltd.). If the initial surface resistance value is $1\times10^{12}\Omega/\square$ or more, the light resistance such as ultraviolet resistance and oxidation resistance of the optical layered body of the present invention may possibly become insufficient. The surface resistance value after the light resistance test is more preferably less than $1\times10^{11}\Omega/\square$ and furthermore preferably less than $1\times10^{10}\Omega/\square$.

The Fade-Ometer is installed in a position at the ambient temperature of 23° C. and a humidity of 65%. The sample size is adjusted by cutting the optical layered body of the present invention in conformity to a sample holder and a light source side is set in the resin layer side face of a sample and the sample is fixed by using a presser plate and a spring. The irradiation intensity is 366 W/m² in a range of 300 to 400 nm and 134 W/m² in a range of 400 to 700 nm.

The optical layered body of the present invention preferably has a total light transmittance of 87.0% or more. If the total light transmittance is smaller than 87.0%, in the case of installation in a display surface, the color reproducibility and visibility may possibly be deteriorated and it may be impossible to obtain desired contrast. The total light transmittance is more preferably 89.0% or more.

The total light transmittance can be measured by a method according to JIS K-7361 using a haze meter (product number: HM-150, manufactured by Murakami Color Research Laboratory).

The optical layered body of the present invention has a contrast ratio of preferably 80% or higher and more preferably 85% or higher. If the contrast ratio is lower than 80%, the visibility may possibly be reduced in the case the optical layered body of the present invention is installed in a display surface. The contrast ratio in this description is a value measured by the following method. Since the contrast ratio measured by the following method is 80% or higher, an image contrast required for a general image display device can be satisfied.

That is, using the one having a diffuser installed in a cold cathode ray tube light source as a back light unit and 2 polarizers (AMN-3244TP, manufactured by Samsung), the contrast is defined as a value ($I_{max}/L_{min}$) calculated by dividing the luminance $L_{max}$ of the light passing when the polarizers are installed in a parallel Nicol's prism by the luminance $I_{min}$ of the light passing when the polarizers are installed in a cross Nicol's prism and the contrast ($L_1$) of the optical layered body is measured by measuring the $L_{max}$ and $L_{min}$ from the resin layer side setting the optical layered body (light transmitting substrate+resin layer) in a manner that the light transmitting substrate is in the polarizer side. Next, the contrast ($L_2$) of the light transmitting substrate is calculated by respectively measuring $L_{max}$ and $L_{min}$ arranging the light transmitting substrate on the polarizers. The value ($L_1/L_2$)×100(%) calculated by dividing ($L_1$) by ($L_2$) is defined as the contrast ratio.

For the measurement of the luminance, a color luminance meter (BM-5A, manufactured by Topcon Corporation) is used, and the measurement angle of the color luminance meter is set to be 1° and the visual field on a sample is set to be φ5 mm. The light quantity of the back light is set in a manner that the luminance becomes 3600 cd/m² without setting a sample when 2 polarizers are installed in a parallel Nicol's prism.

A method for producing an optical layered body of the present invention may be a method including a step of forming a resin layer using the resin layer composition.

The resin layer composition comprises a binder resin, a polythiophene, an auxiliary conductive agent, a leveling agent, and a solvent.

The present invention also includes the method for producing an optical layered body.

The light transmitting substrate, the resin layer composition, and the method of forming the resin layer are as described above.

Specifically, the method for producing an optical layered body of the present invention may be a method including the steps of forming a resin layer on a light transmitting substrate using the resin layer composition and forming a low refractive index layer on the resin layer if necessary. In the case of a configuration in which a resin layer is formed on the rough surface under coat layer, the method includes the steps of forming the rough surface under coat layer and forming the resin layer on the rough surface under coat layer. The methods for forming the resin layer, the low refractive index layer, and the rough surface under coat layer are as described above.

The optical layered body of the present invention can be used as a polarizer by forming the surface opposite to the surface where the resin layer of the light transmitting substrate of the optical layered body on the surface of a polarizing element. The present invention also includes such a polarizer.

The polarizing element is not particularly limited and examples include a polyvinyl alcohol film, a polyvinyl formal film, a polyvinyl acetal film, and a saponified ethylene-vinyl acetate copolymer film which are dyed with iodine or the like and stretched. In the laminating treatment of the polarizing element and the optical layered body, the light transmitting substrate is preferably saponified. The saponification treatment improves the adhesion property and also causes an antistatic effect. A pressure-sensitive adhesive may be used for adhesion. Examples of the pressure-sensitive adhesive include an acrylic pressure-sensitive adhesive, a urethane pressure-sensitive adhesive, a silicone pressure-sensitive adhesive, and a water-based pressure-sensitive adhesive.

The optical layered body and the polarizer of the invention may be set on the outermost surface of an image display device. The present invention also includes the image display device.

The image display device may be a non-self-emitting image display device such as LCD; or a self-emitting image display device such as PDP, FED, ELD (organic EL, inorganic EL), or CRT.

LCD, one representative example of the non-self-emitting type, has a light transmitting display body and a light source apparatus for irradiating light from the back side of the light transmitting display body. In the case the image display device of the present invention is LCD, the optical layered body or the polarizer is formed on the surface of the light transmitting display body.

In the case of a liquid crystal display device having the optical layered body of the present invention, the light source of a light source apparatus radiates light from the light transmitting substrate side of the optical layered body. In addition, for a STN type, VA type, or IPS type liquid crystal display device, a retardation plate may be inserted between the liquid crystal display element and the polarizer. If necessary, an adhesive layer may be formed between respective neighboring layers of the liquid crystal display device.

PDP, which is a self-emitting image display device, has a surface glass substrate (electrodes are formed on the surface) and a backplane glass substrate (electrodes and fine grooves are formed on the surface and red-, green-, and blue-emitting phosphor layers are formed in the grooves) arranged on the opposite side to the surface glass substrate with an electric discharge gas enclosed in the space therebetween. In the case the image display device of the present invention is PDP, the optical layered body is set on the surface of the surface glass substrate or its front plate (glass substrate or film substrate).

The self-emitting image display device may be an image display device such as an ELD device for carrying out display by vapor-depositing a light emitting body such as zinc sulfide or a diamine substance which emits light by voltage application on a glass substrate and controlling the voltage applied to the substrate, or CRT for generating an image visible to human's eyes by converting electric signals to light rays. In this case, the optical layered body is set on the outermost surface or the surface of the front plate of the respective display devices described above.

The optical layered body of the present invention can be used in any case for display of a television, a computer, a mobile phone, or the like. Particularly, the optical layered body can be used preferably for the surface of a display for high definition images such as CRT, a liquid crystal panel, PDP, ELD, FED, a touch panel, or electronic paper.

Advantageous Effects of Invention

Having the above-mentioned configuration, an optical layered body of the present invention is made excellent in the antistatic property, has high image contrast in the case of employed for an image display device, and is excellent in ultraviolet resistance and oxidation resistance while keeping conventional physical properties and optical properties. Accordingly, the optical layered body of the present invention can be used preferably for a cathode ray tube display device (CRT), a liquid crystal display (LCD), a plasma display (PDP), an electroluminescence display (ELD), a field emission display (FED), a touch panel, and electronic paper.

BRIEF DESCRIPTION OF DRAWINGS

FIG. 2: An explanatory drawing for a method for measuring θa.

DESCRIPTION OF EMBODIMENTS

Figure 1:
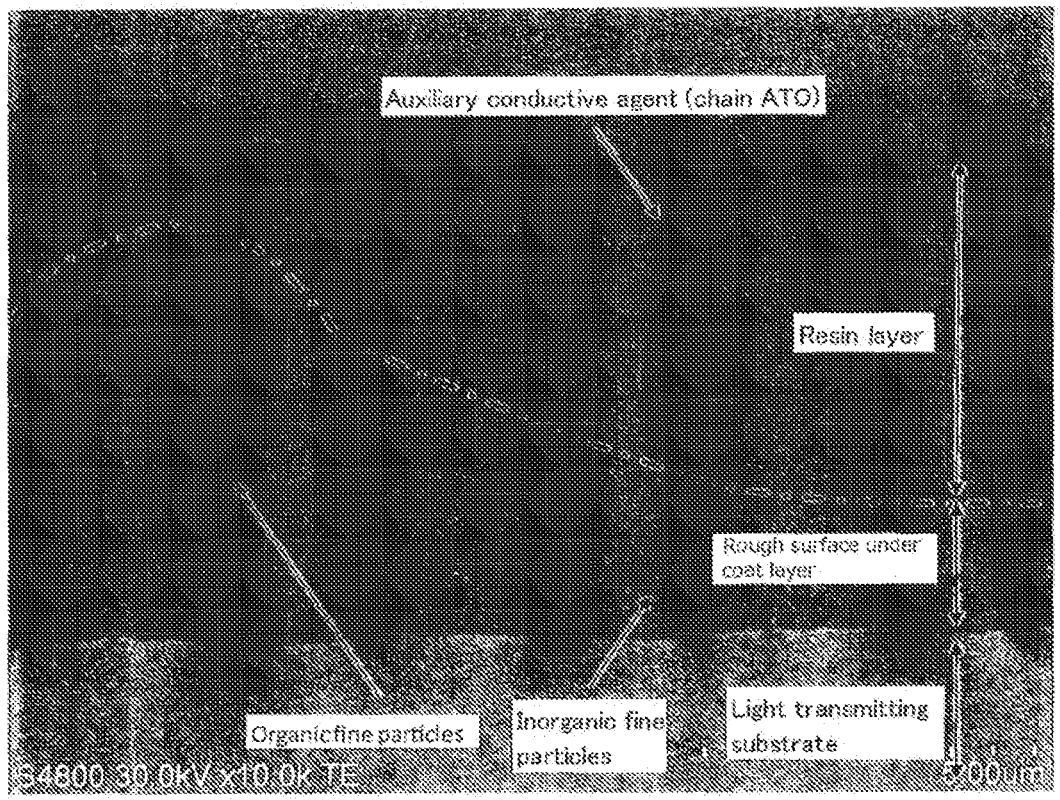
FIG. 1: A cross sectional SEM photograph of an optical layered body of the present invention having a resin layer containing chain ATO as an auxiliary conductive agent.
Figure 2:
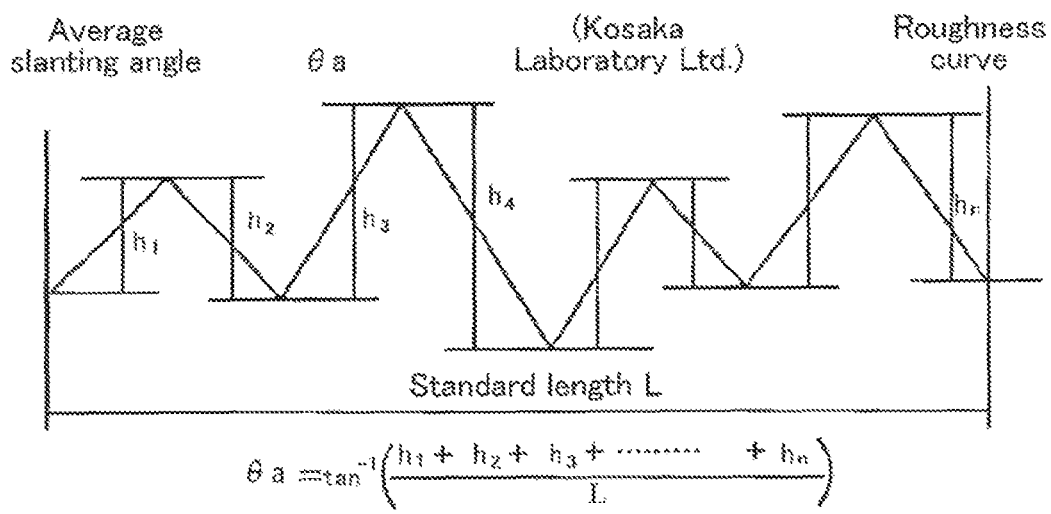
Figure 3:
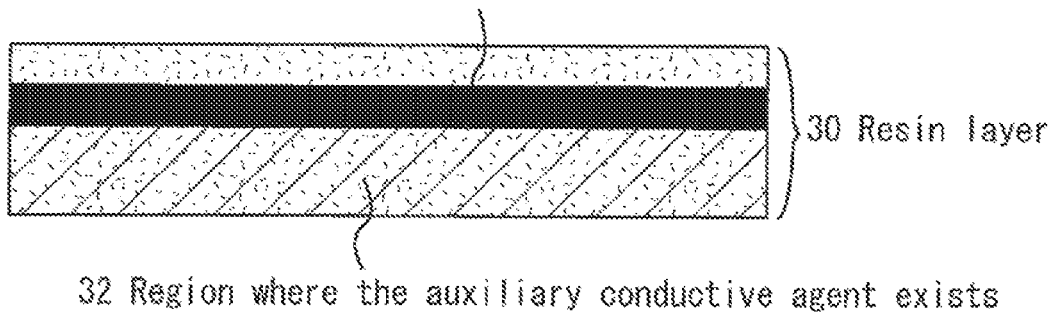
FIG. 3: A cross sectional drawing schematically showing a resin layer of the optical layered body of the present invention.
Figure 4:
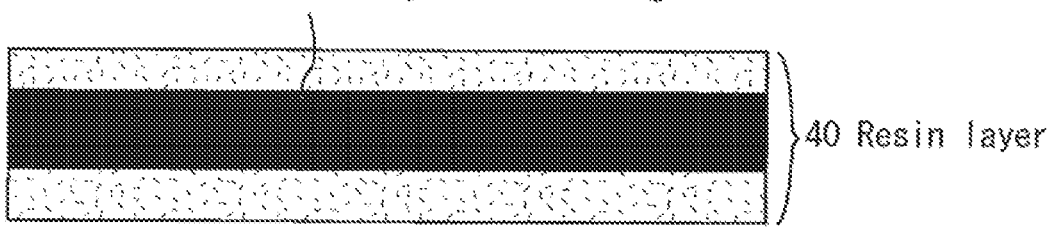
FIG. 4: A cross sectional drawing schematically showing a resin layer of the optical layered body of the present invention.
Figure 5:
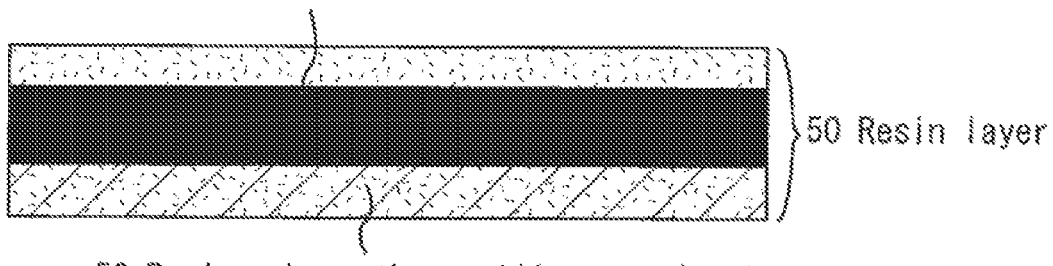
FIG. 5: A cross sectional drawing schematically showing a resin layer of the optical layered body of the present invention.

Hereinafter, the present invention will be described in more detail with reference to examples and comparative examples; however, the present invention should not be limited to those examples and comparative examples.

In the description, "part(s)" and "%" are on the basis of weight unless otherwise specified.

Example 1

A light transmitting substrate (a triacetyl cellulose resin film with a thickness of 80 μm, TD80 UL, manufactured by Fuji Film) was prepared and a resin layer composition having the composition described below was applied to one surface of the light transmitting substrate to form a coating film. Next, the formed coating film was dried in a hot oven at 50° C. for 60 seconds to evaporate the solvent therefrom and hardened by irradiation with ultraviolet rays in the integrated light quantity of 50 mJ/cm² to form a resin layer with a thickness of 4 μm (after hardening) and thus produce an optical layered body of Example 1.

(Resin Layer Composition)

PEDOT/PSS (organic solvent dispersion type poly(3,4-ethylenedioxythiophene/polystyrenesulfonic acid) (CLEV-IOS P; produced by H.C. Starck) 0.5 parts by weight Chain ATO (V-3560; Chain ATO dispersion (non-volatile matter 20.5%), produced by JGC C&C) 1.2 parts by weight Urethane acrylate (BS 577, hexa-functional, weight average molecular weight 1000 (containing 60% PETA in solid content), produced by Arakawa Chemical Industries, Ltd.) 50.0 parts by weight Acrylic ester (M-450, pentaerythritol tetraacrylate (PETTA), produced by To a Gosei Co., Ltd.) 45.0 parts by weight Epoxy acrylate (Hitaloid 7851, produced by Hitachi Chemical Co., Ltd.) 5.0 parts by weight Polymerization initiator (Irgacure 184, produced by Ciba, Japan) 6.0 parts by weight Polyether-modified silicone oil (TSF 4460, produced by Momentive Performance Materials, Japan) 1.0 part by weight MIBK 150.0 parts by weight n-BuOH 100.0 parts by weight Example 2

An optical layered body of Example 2 was produced in the same manner as in Example 1, except that a resin layer composition prepared by mixing 0.01 parts by weight of carbon nanotubes (VGCF-X, produced by Showa Denko K.K.) was used in place of the chain ATO.

Example 3

An optical layered body of Example 3 was produced in the same manner as in Example 1, except that a resin layer composition prepared by mixing 1.2 parts by weight of ATO (XJB-0014, produced by Pelnox Ltd., non-volatile matter 30.0%) was used in place of the chain ATO.

Example 4

A light transmitting substrate (a triacetyl cellulose resin film with a thickness of 80 μm, TD80 UL, manufactured by Fuji Film) was prepared and a resin layer composition having the composition described below was applied to one surface of the light transmitting substrate to form a coating film. Next, the formed coating film was dried in a hot oven at 50° C. for 60 seconds to evaporate the solvent therefrom and hardened by irradiation with ultraviolet rays in the integrated light quantity of 50 mJ/cm$^2$ to form a resin layer with a thickness of 6 μm (after hardening) and having an uneven shape in the surface and thus produce an optical layered body of Example 4.

(Resin Layer Composition)

PEDOT/PSS (organic solvent dispersion type poly(3,4-ethylenedioxythiophene/polystyrenesulfonic acid) (CLEVIOS P; produced by H.C. Starck) 0.5 parts by weight Chain ATO (V-3560; Chain ATO dispersion (non-volatile matter 20.5%) produced by JGC C&C) 1.2 parts by weight Urethane acrylate (BS 577, hexa-functional, weight average molecular weight 1000 (containing 60% PETA in solid content), produced by Arakawa Chemical Industries, Ltd.) 50.0 parts by weight Acrylic ester (M-450, pentaerythritol tetraacrylate (PETTA), produced by To a Gosei Co., Ltd.) 45.0 parts by weight Epoxy acrylate (Hitaloid 7851, produced by Hitachi Chemical Co., Ltd.) 5.0 parts by weight Styrene-acrylic copolymer particles (average particle diameter 3.5 μm, refractive index 1.54, produced by Sekisui Plastics Co., Ltd.) 10.0 parts by weight Polymerization initiator (Irgacure 184, produced by Ciba, Japan) 6.0 parts by weight Polyether-modified silicone oil (TSF 4460, produced by Momentive Performance Materials, Japan) 1.0 part by weight MIBK 150.0 parts by weight n-BuOH 100.0 parts by weight Examples 5 and 6

Optical layered bodies of Examples 5 and 6 having an uneven shape in the resin layer surface were produced in the same manner as in Example 4, except that the addition amount of PEDOT/PSS, the kind of the auxiliary conductive agent, and the addition amount of the auxiliary conductive agent were changed as shown in the following Table 1.

In "kind of auxiliary conductive agent" in Table 1, the, "Carbon nanotubes" is VGCF-X (produced by Showa Denko K.K.) and "ATO" is XJB-0014 (produced by Pelnox Ltd., non-volatile matter 30.0%).

TABLE 1

| | Example | | | | | |
|---|---|---|---|---|---|---|
| | 1 | 2 | 3 | 4 | 5 | 6 |
| Layer configuration | Single layer (H) | Single layer (H) | Single layer (H) | Single layer (A) | Single layer (A) | Single layer (A) |
| PEDOT/PSS (parts by mass) | 0.7 | 0.7 | 0.7 | 0.15 | 0.15 | 0.15 |
| Kind of auxiliary conductive agent | Chain ATO | CNT | ATO | Chain ATO | CNT | ATO |
| Auxiliary conductive agent (parts by mass) | 1.2 | 0.01 | 1.2 | 1.2 | 0.01 | 1.2 |

Single layer (H): resin layer is formed on light transmitting substrate.
Single layer (A): resin layer having antiglare function is formed on light transmitting substrate.

Comparative Example 1

A resin layer was formed in the same manner as in Example 1 and an optical layered body of Comparative Example 1 was produced, except that no PEDOT/PSS was added and the addition amount of the auxiliary conductive agent was changed as shown in the following Table 2.

Examples 7 to 18, Comparative Examples 2 to 4 and 6, and Experimental Examples 11 to 8

A light transmitting substrate (a triacetyl cellulose resin film with a thickness of 80 μm, TD80 UL, manufactured by Fuji Film) was prepared and a composition for a rough surface under coat layer having the composition described below was applied to one surface of the light transmitting substrate to form a coating film.

(Composition for Rough Surface Under Coat Layer)

Acrylic-styrene copolymer beads (particle diameter 5 μm, refractive index 1.55, produced by Soken Chemical & Engineering Co., Ltd.) 15 parts by weight Amorphous silica NIPGEL (AZ-204, average particle diameter 1.5 μm, produced by Tosoh Silica Co., Ltd.) 5 parts by weight Pentaerythritol acrylate (PETA, PET-30, produced by Nippon Kayaku Co., Ltd.) 100 parts by weight Irgacure 184 (produced by Ciba, Japan) 6 parts by weight Irgacure 907 (produced by Ciba, Japan) 1 part by weight Polyether-modified silicone (TSF 4460, produced by Momentive Performance Materials, Japan) 0.025 parts by weight Toluene 150 parts by weight Cyclohexanone 80 parts by weight Next, the formed coating film was dried in a hot oven at 50° C. for 60 seconds to evaporate the solvent therefrom and hardened by irradiation with ultraviolet rays in the integrated light quantity of 30 mJ/cm² to form a rough surface under coat layer having a portion containing only the resin with a thickness of 3 μm (after hardening).

A resin layer was formed in the same manner as in Example 1, except that the addition amount of PEDOT/PSS, the kind of the auxiliary conductive agent, and the addition amount of the auxiliary conductive agent in the resin layer composition were changed as shown in the following Table 2 for formation of an upper layer of the rough surface under coat layer and thus optical layered bodies of respective examples, comparative examples, and experimental examples were produced.

In "kind of auxiliary conductive agent" in Table 2, "CNT" is carbon nanotubes (VGCF-X (produced by Showa Denko K.K.)) and "ATO" is XJB-0014 (produced by Pelnox Ltd., non-volatile matter 30.0%).

Comparative Example 5, and Experimental Examples 9 and 10

A resin layer composition of Comparative Example 5 was prepared in the same manner as in Example 1, except that no leveling agent was added.

A resin layer composition of Experimental Example 9 was prepared in the same manner as in Example 1, except that no epoxy acrylate was added and a resin layer composition of Experimental Example 10 was prepared in the same manner as in Example 1, except that only pentaerythritol triacrylate (PETA, PET-30, produced by Nippon Kayaku Co., Ltd.) was used as a binder resin.

Optical layered bodies of Comparative Example 7, Experimental Example 9, and Experimental Example 10 were produced in the same manner as in Example 12, except that the obtained resin layer compositions were used.

Example 19

A light transmitting substrate (a triacetyl cellulose resin film with a thickness of 80 μm, TD80 UL, manufactured by Fuji Film) was prepared and a resin layer composition having the composition described below was applied to one surface of the light transmitting substrate to form a coating film. Next, the formed coating film was dried in a hot oven at 50° C. for 60 seconds to evaporate the solvent therefrom and hardened by irradiation with ultraviolet rays in the integrated light quantity of 50 mJ/cm² to form a resin layer with a thickness of 6 μm (after hardening) and having an uneven shape in the surface and thus produce an optical layered body of Example 19.

(Resin Layer Composition)

PEDOT/PSS (organic solvent dispersion type poly(3,4-ethylenedioxythiophene/polystyrenesulfonic acid) (CLEVIOS P; produced by H.C. Starck) 0.5 parts by weight Chain ATO (V-3560; Chain ATO dispersion (non-volatile matter 20.5%) produced by JGC C&C) 1.2 parts by weight Urethane acrylate (BS 577, hexa-functional, weight average molecular weight 1000 (containing 60% PETA in solid content), produced by Arakawa Chemical Industries, Ltd.) 50.0 parts by weight Acrylic ester (M-450, pentaerythritol tetraacrylate (PETTA), produced by To a Gosei Co., Ltd.) 45.0 parts by weight Epoxy acrylate (Hitaloid 7851, produced by Hitachi Chemical Co., Ltd.) 5.0 parts by weight Styrene-acrylic copolymer particles (average particle diameter 3.5 μm, refractive index 1.54, produced by Sekisui Plastics Co., Ltd.) 10.0 parts by weight Polymerization initiator (Irgacure 184, produced by Ciba, Japan) 6.0 parts by weight

TABLE 2

| | Example | | | | | | | | | | | |
|---|---|---|---|---|---|---|---|---|---|---|---|---|
| | 7 | 8 | 9 | 10 | 11 | 12 | 13 | 14 | 15 | 16 | 17 | 18 |
| Layer configuration | Two layer | Two layer | Two layer | Two layer | Two layer | Two layer | Two layer | Two layer | Two layer | Two layer | Two layer | Two layer |
| PEDOT/PSS (parts by mass) | 0.5 | 0.5 | 0.5 | 0.5 | 0.5 | 0.5 | 0.5 | 0.5 | 0.5 | 0.5 | 0.5 | 0.5 |
| Kind of auxiliary conductive agent | Chain ATO | Chain ATO | Chain ATO | Chain ATO | CNT | CNT | CNT | CNT | ATO | ATO | ATO | ATO |
| Auxiliary conductive agent (parts by mass) | 0.6 | 1.2 | 2.4 | 4.8 | 0.0015 | 0.01 | 0.02 | 0.12 | 0.6 | 1.2 | 2.4 | 4.8 |

| | Comparative Example | | | | | | Example | | | | | | | | | |
|---|---|---|---|---|---|---|---|---|---|---|---|---|---|---|---|---|
| | 1 | 2 | 3 | 4 | 5 | 6 | 1 | 2 | 3 | 4 | 5 | 6 | 7 | 8 | 9 | 10 |
| Layer configuration | Single layer (A) | Two layer | Two layer | Two layer | Two layer | Two layer | Two layer | Two layer | Two layer | Two layer | Two layer | Two layer | Two layer | Two layer | Two layer | Two layer |
| PEDOT/PSS (parts by mass) | 0 | 0 | 0 | 0 | 0.5 | 0.5 | 0.05 | 1.3 | 0.5 | 0.5 | 0.5 | 0.5 | 0.5 | 0.5 | 0.5 | 0.5 |
| Kind of auxiliary conductive agent | Chain ATO | Chain ATO | CNT | ATO | CNT | None | Chain ATO | Chain ATO | Chain ATO | Chain ATO | CNT | CNT | ATO | ATO | CNT | CNT |
| Auxiliary conductive agent (parts by mass) | 5.2 | 5.2 | 0.14 | 5.2 | 0.01 | 0 | 1.2 | 1.2 | 0.4 | 5.2 | 0.0005 | 0.14 | 0.4 | 5.2 | 0.01 | 0.01 |

Single layer (H): resin layer is formed on light transmitting substrate.
Two layer: rough surface under coat layer and resin layer are formed on light transmitting substrate.

Polyether-modified silicone oil (TSF 4460, produced by Momentive Performance Materials, Japan) 1.0 part by weight
MIBK 150.0 parts by weight
n-BuOH 100.0 parts by weight A composition for a low refractive index layer with the following composition was applied to the outermost surface of the obtained resin layer so that the film thickness after drying (40° C.×1 min) became 0.1 μm. Thereafter, the coating film was hardened by ultraviolet ray irradiation with an irradiation intensity of 100 mJ/cm$^2$ using an ultraviolet irradiation apparatus (light source H bulb, manufactured by Fusion UV System, Japan) to obtain an optical layered body of Example 19. The film thickness was adjusted in a manner that the minimum value of the reflectance became around a wavelength of 550 nm.

(Composition for Low Refractive Index Layer)

Hollow silica fine particles (solid content of silica fine particles: 20 wt. %, solution; methyl isobutyl ketone, average particle diameter: 50 nm) 73 parts by weight
Fluorine atom-containing polymer (Opstar JN 35, produced by JSR, refractive index 1.41, weight average molecular weight 30000) 1 part by weight on the basis of solid content
Fluorine atom-containing monomer (LINC 3a, produced by Kyoeisha Chemical Co., Ltd., reflective index 1.42) 7 parts by weight
Pentaerythritol acrylate (PETA, PET-30, produced by Nippon Kayaku Co., Ltd.) 2 parts by weight
Polymerization initiator (Irgacure 127, produced by Ciba, Japan) 0.35 parts by weight
Modified silicone oil (X 22164E; produced by Shin-Etsu Chemical Co., Ltd) 0.5 parts by weight
Modified silicone oil (FM 7711; produced by Chisso Corporation) 0.5 parts by weight
MIBK 320 parts by weight
PGMEA 161 parts by weight Examples 20 and 21

A resin layer was formed in the same manner as in Example 19, except that the type of the auxiliary conductive agent and the addition amount of the auxiliary conductive agent of the resin layer composition were changed as shown in the following Table 3 and a low refractive index layer was formed under the same conditions as in Example 19 on the outermost surface of the resin layer to produce optical layered bodies of Examples 20 and 21.

In "kind of auxiliary conductive agent" in Table 3, "Carbon nanotubes" is VGCF-X (produced by Showa Denko K.K.) and "ATO" is XJB-0014 (produced by Pelnox Ltd., non-volatile matter 30.0%).

Example 22

A light transmitting substrate (a triacetyl cellulose resin film with a thickness of 80 μm, TD80 UL, manufactured by Fuji Film) was prepared and a resin layer composition having the composition described below was applied to one surface of the light transmitting substrate to form a coating film. Next, the formed coating film was dried in a hot oven at 50° C. for 60 seconds to evaporate the solvent therefrom and hardened by irradiation with ultraviolet rays in the integrated light quantity of 50 mJ/cm$^2$ to form a resin layer with a thickness of 4 μm (after hardening).

Then, a low refractive index layer was formed under the same conditions as in Example 19 on the outermost surface of the formed resin layer to produce an optical layered body of Example 22.

(Resin Layer Composition)

PEDOT/PSS (organic solvent dispersion type poly(3,4-ethylenedioxythiophene/polystyrenesulfonic acid) (CLEVIOS P; produced by H.C. Starck) 0.5 parts by weight
Chain ATO (V-3560; Chain ATO dispersion (non-volatile matter 20.5%) produced by JGC C&C) 1.2 parts by weight
Urethane acrylate (BS 577, hexa-functional, weight average molecular weight 1000 (containing 60% PETA in solid content), produced by Arakawa Chemical Industries, Ltd.) 50.0 parts by weight
Acrylic ester (M-450, pentaerythritol tetraacrylate (PETTA), produced by To a Gosei Co., Ltd.) 45.0 parts by weight
Epoxy acrylate (Hitaloid 7851, produced by Hitachi Chemical Co., Ltd.) 5.0 parts by weight
Polymerization initiator (Irgacure 184, produced by Ciba, Japan) 6.0 parts by weight
Polyether-modified silicone oil (TSF 4460, produced by Momentive Performance Materials, Japan) 1.0 part by weight
MIBK 150.0 parts by weight
n-BuOH 100.0 parts by weight Examples 23 and 24

A resin layer was formed in the same manner as in Example 22, except that the kind of the auxiliary conductive agent and the addition amount of the auxiliary conductive agent of the resin layer composition were changed as shown in the following Table 3 and a low refractive index layer was formed under the same conditions as in Example 19 on the outermost surface of the resin layer to produce optical layered bodies of Examples 23 and 24.

In "kind of auxiliary conductive agent" in Table 3, "Carbon nanotubes" is VGCF-X (produced by Showa Denko K.K.) and "ATO" is XJB-0014 (produced by Pelnox Ltd., non-volatile matter 30.0%).

Example 25

A light transmitting substrate (a triacetyl cellulose resin film with a thickness of 80 μm, TD80 UL, manufactured by Fuji Film) was prepared and a composition for a rough surface under coat layer having the composition described below was applied to one surface of the light transmitting substrate to form a coating film.

(Composition for Rough Surface Under Coat Layer)

Acrylic-styrene copolymer beads (particle diameter 5 μm, refractive index 1.55, produced by Soken Chemical & Engineering Co., Ltd.) 15 parts by weight
Amorphous silica NIPGEL (AZ-204, average particle diameter 1.5 μm, produced by Tosoh Silica Co., Ltd.) 5 parts by weight
Pentaerythritol acrylate (PETA, PET-30, produced by Nippon Kayaku Co., Ltd.) 100 parts by weight
Irgacure 184 (produced by Ciba, Japan) 6 parts by weight
Irgacure 907 (produced by Ciba, Japan) 1 part by weight
Polyether-modified silicone (TSF 4460, produced by Momentive Performance Materials, Japan) 0.025 parts by weight
Toluene 150 parts by weight
Cyclohexanone 80 parts by weight Next, the formed coating film was dried in a hot oven at 50° C. for 60 seconds to evaporate the solvent therefrom and hardened by irradiation with ultraviolet rays in the integrated light quantity of 30 mJ/cm² to form a rough surface under coat layer having a portion containing only the resin with a thickness of 3 μm (after hardening).

A resin layer was formed in the same manner as in Example 1, except that the addition amount of PEDOT/PSS, the kind of the auxiliary conductive agent, and the addition amount of the auxiliary conductive agent were changed as shown in the following Table 3 for formation of an upper layer of the rough surface under coat layer.

Then, a low refractive index layer was formed under the same conditions as in Example 19 on the outermost surface of the formed resin layer to produce an optical layered body of Example 25.

Examples 26 and 27

A rough surface under coat layer and a resin layer were formed in the same manner as in Example 25, except that the addition amount of PEDOT/PSS, the kind of auxiliary conductive agents, and the addition amount of the auxiliary conductive agent in the resin layer composition were changed as shown in the following Table 3. Then, a low refractive index layer was formed under the same conditions as in Example 19 on the outermost surface of the formed resin layer to produce optical layered bodies of Examples 26 and 27.

In "kind of auxiliary conductive agent" in Table 3, "Carbon nanotubes" is VGCF-X (produced by Showa Denko K.K.) and "ATO" is XJB-0014 (produced by Pelnox Ltd., non-volatile matter 30.0%).

(Contrast Ratio)

In the contrast ratio measurement, using the one having a diffuser installed in a cold cathode ray tube light source as a back light unit and 2 polarizers (AMN-3244TP, manufactured by Samsung), the contrast ($L_1$) of the optical layered body (light transmitting substrate+resin layer) and the contrast ($L_2$) of the light transmitting substrate were measured by dividing the $L_{max}$ of the luminance of the light passing in the case the polarizers were installed in a parallel Nicol's prism by the $L_{min}$ of the luminance of the light passing in the case the polarizers were installed in a cross Nicol's prism and the contrast ratio was calculated according to $(L_1/L_2) \times 100(\%)$.

For the measurement of the luminance, a color luminance meter (BM-5A, manufactured by Topcon Corporation) was used. The measurement angle of the color luminance meter was set to be 1° and the measurement was carried out in ϕ5 mm visual field on a sample. The light quantity of the back light was set in a manner that the luminance became 3600 cd/m₂ without setting a sample when 2 polarizers were installed in a parallel Nicol's prism.

(Total Light Transmittance)

The total light transmittance of each optical layered body was measured by a method according to JIS K-7361 (total light transmittance) using a haze meter (product number: HM-150, manufactured by Murakami Color Research Laboratory).

(Production Stability)

Each composition prepared in respective examples, comparative examples, and experimental examples was applied in

TABLE 3

| | Example | | | | | | | | |
|---|---|---|---|---|---|---|---|---|---|
| | 19 | 20 | 21 | 22 | 23 | 24 | 25 | 26 | 27 |
| Layer configuration | Single layer (A) + low refractive index layer | Single layer (A) + low refractive index layer | Single layer (A) + low refractive index layer | Single layer (H) + low refractive index layer | Single layer (H) + low refractive index layer | Single layer (H) + low refractive index layer | Two layers + low refractive index layer | Two layers + low refractive index layer | Two layers + low refractive index layer |
| PEDOT/PSS (parts by mass) | 0.5 | 0.5 | 0.5 | 0.5 | 0.5 | 0.5 | 0.5 | 0.5 | 0.5 |
| Kind of auxiliary conductive agent | Chain ATO | CNT | ATO | Chain ATO | CNT | ATO | Chain ATO | CNT | ATO |
| Auxiliary conductive agent (parts by mass) | 1.2 | 0.01 | 1.2 | 1.2 | 0.01 | 1.2 | 1.2 | 0.01 | 1.2 |

Single layer (H): resin layer is formed on light transmitting substrate.
Single layer (A): resin layer having antiglare function is formed on light transmitting substrate.
Two layer: rough surface under coat layer and resin layer are formed on light transmitting substrate.

The obtained optical layered bodies of Examples 1 to 27, Comparative Examples 1 to 6, and Experimental Examples 1 to 10 were subjected to the evaluation of the following items. The evaluation results are shown in Table 4 and Table 5.

(Surface Resistance Value)

Regarding the surface resistance value of the surface of the resin layer of each of the obtained optical layered bodies, the initial surface resistance value immediately after the production was measured by using a surface resistance measurement apparatus (product number: Hiresta IP MCP-HT260, manufactured by Mitsubishi Chemical Corporation). Regarding each of the obtained optical layered bodies, the surface resistance value after 100 hours was measured by using Fade-OMeter (FAL-AU-B, manufactured by Suga Test Instruments Co., Ltd.) for light resistance evaluation.

a large size larger than 1 m² square; an arbitrary portion of 1 m² square in the plane was cut out; the obtained 1 m² square sheet was divided into 4 square portions to obtain sheet samples; the initial surface resistance value at an arbitrary position of each sample was measured by the same method as that employed for the above-mentioned evaluation of the surface resistance; and each measured value was used for evaluation according to the following standard.

Excellent: The number of points at which the surface resistance values differed in one digit order was 1 or less.

Good: The number of points at which the surface resistance values differed in one digit order was 2.

Poor: There were points at which the surface resistance values differed in two or more digit order.

(Comprehensive Evaluation)

Regarding the initial surface resistance value, the surface resistance value after the light resistance test, the contrast ratio, and the total light transmittance, the respective evaluations for the comprehensive evaluation were carried out as follows and each optical layered body of respective examples, comparative examples, and experimental examples was comprehensively evaluated as follows.

(Individual Evaluation)

(1) Initial Surface Resistance Value and Surface Resistance Value after Light Resistance Test Excellent: less than the order of $1 \times 10^{11} \Omega/\square$
Good: less than the order of $1 \times 10^{12} \Omega/\square$
Poor; equal to or more than the order of $1 \times 10^{12} \Omega/\square$ (2) Contrast Ratio
Excellent: equal to or higher than 85%
Good: equal to or higher than 80% and lower than 85%
Poor: lower than 80%

(3) Total Light Transmittance
Excellent: equal to or higher than 89%
Good: equal to or higher than 87% and lower than 89%
Poor: lower than 87%

(Comprehensive Evaluation)
Excellent: All of the individual evaluations and production stability were marked with Excellent
Good: There was at least one marked with Good among the individual evaluations and production stability
Poor: There was at least one marked with Poor among the individual evaluations and production stability

TABLE 4

|  |  | Initial surface resistance value ($\Omega/\square$) | Light resistance (100 h) Surface resistance ($\Omega/\square$) | Contrast ratio (%) | Total light transmittance (%) | Production stability | Comprehensive evaluation |
|---|---|---|---|---|---|---|---|
| Example | 1 | $8.00 \times 10^8$ | $9.00 \times 10^8$ | 86 | 89.2 | Excellent | Excellent |
|  | 2 | $2.00 \times 10^9$ | $4.00 \times 10^9$ | 89 | 90.0 | Excellent | Excellent |
|  | 3 | $1.00 \times 10^9$ | $3.00 \times 10^9$ | 87 | 89.8 | Excellent | Excellent |
|  | 4 | $2.00 \times 10^{10}$ | $5.00 \times 10^{10}$ | 96 | 91.2 | Excellent | Excellent |
|  | 5 | $4.00 \times 10^{10}$ | $6.00 \times 10^{10}$ | 97 | 91.3 | Excellent | Excellent |
|  | 6 | $1.00 \times 10^{10}$ | $4.00 \times 10^{10}$ | 97 | 91.1 | Excellent | Excellent |
|  | 7 | $5.00 \times 10^9$ | $6.00 \times 10^9$ | 89 | 90.7 | Excellent | Excellent |
|  | 8 | $1.00 \times 10^9$ | $2.00 \times 10^9$ | 88 | 90.4 | Excellent | Excellent |
|  | 9 | $4.00 \times 10^8$ | $8.00 \times 10^8$ | 87 | 90.2 | Excellent | Excellent |
|  | 10 | $2.00 \times 10^8$ | $6.00 \times 10^8$ | 85 | 89.5 | Excellent | Excellent |
|  | 11 | $6.00 \times 10^9$ | $1.00 \times 10^{10}$ | 91 | 90.8 | Excellent | Excellent |
|  | 12 | $3.00 \times 10^8$ | $5.00 \times 10^9$ | 90 | 90.6 | Excellent | Excellent |
|  | 13 | $9.00 \times 10^8$ | $2.00 \times 10^9$ | 89 | 90.2 | Excellent | Excellent |
|  | 14 | $5.00 \times 10^8$ | $7.00 \times 10^8$ | 87 | 89.0 | Excellent | Excellent |
|  | 15 | $3.00 \times 10^{10}$ | $4.00 \times 10^{10}$ | 89 | 90.6 | Excellent | Excellent |
|  | 16 | $3.00 \times 10^9$ | $5.00 \times 10^9$ | 88 | 90.3 | Excellent | Excellent |
|  | 17 | $9.00 \times 10^8$ | $3.00 \times 10^9$ | 87 | 90.1 | Excellent | Excellent |
|  | 18 | $5.00 \times 10^8$ | $6.00 \times 10^8$ | 85 | 90.0 | Excellent | Excellent |
| Comparative Example | 1 | ND | — | — | 90.0 | — | Poor |
|  | 2 | ND | — | — | 90.0 | — | Poor |
|  | 3 | ND | — | — | 81.7 | — | Poor |
|  | 4 | ND | — | — | 89.9 | — | Poor |
|  | 5 | $1.00 \times 10^9$ | ND | 90 | 90.6 | Good | Poor |
|  | 6 | ND | ND | 90 | 90.6 | Poor | Poor |
| Example | 1 | $6.00 \times 10^{11}$ | $9.00 \times 10^{11}$ | 98 | 91.4 | Good | Good |
|  | 2 | $6.00 \times 10^8$ | $8.00 \times 10^8$ | 81 | 87.5 | Excellent | Good |
|  | 3 | $6.00 \times 10^{11}$ | $8.00 \times 10^{11}$ | 91 | 90.9 | Good | Good |
|  | 4 | $1.00 \times 10^8$ | $5.00 \times 10^8$ | 81 | 87.7 | Excellent | Good |
|  | 5 | $3.00 \times 10^{11}$ | $7.00 \times 10^{11}$ | 92 | 91.0 | Good | Good |
|  | 6 | $4.00 \times 10^8$ | $6.00 \times 10^8$ | 84 | 88.6 | Excellent | Good |
|  | 7 | $4.00 \times 10^{11}$ | $7.00 \times 10^{11}$ | 90 | 90.9 | Good | Good |
|  | 8 | $4.00 \times 10^8$ | $5.00 \times 10^8$ | 80 | 87.1 | Excellent | Good |
|  | 9 | $1.00 \times 10^{11}$ | $5.00 \times 10^{11}$ | 90 | 90.6 | Good | Good |
|  | 10 | ND | — | 90 | 90.6 | — | Poor |

"ND" indicates that measurement could not be performed or the value was out the range (resistance value was $10^{12} \Omega/\square$ or higher).

TABLE 5

|  |  | Initial surface resistance value ($\Omega/\square$) | Light resistance (100 h) Surface resistance ($\Omega/\square$) | Contrast ratio (%) | Total light transmittance (%) | Production stability | Comprehensive evaluation |
|---|---|---|---|---|---|---|---|
| Example | 19 | $6.00 \times 10^8$ | $8.00 \times 10^9$ | 93 | 93.3 | Excellent | Excellent |
|  | 20 | $8.00 \times 10^9$ | $9.00 \times 10^8$ | 94 | 93.2 | Excellent | Excellent |
|  | 21 | $7.00 \times 10^9$ | $7.00 \times 10^8$ | 93 | 93.3 | Excellent | Excellent |
|  | 22 | $5.00 \times 10^8$ | $7.00 \times 10^9$ | 93 | 94.0 | Excellent | Excellent |
|  | 23 | $7.00 \times 10^9$ | $8.00 \times 10^9$ | 95 | 94.1 | Excellent | Excellent |
|  | 24 | $8.00 \times 10^9$ | $7.00 \times 10^8$ | 94 | 94.0 | Excellent | Excellent |
|  | 25 | $7.00 \times 10^8$ | $8.00 \times 10^9$ | 92 | 93.1 | Excellent | Excellent |
|  | 26 | $8.00 \times 10^9$ | $9.00 \times 10^8$ | 92 | 93.1 | Excellent | Excellent |
|  | 27 | $7.00 \times 10^9$ | $7.00 \times 10^6$ | 92 | 93.1 | Excellent | Excellent |

As shown in Tables 4 and 5, the initial surface resistance value, the surface resistance value after the light resistance test, the contrast ratio, and the total light transmittance showed similar tendency regardless of the kinds of the auxiliary conductive agents if the content of the auxiliary conductive agent was around a preferable range.

As shown also in Tables 4 and 5, all the optical layered bodies of examples were found excellent in light resistance and antistatic property and had desired high contrast while maintaining excellent optical properties. With respect to monolayer ones, bilayer ones, and those having a low refractive index layer formed additionally, no significant difference of effect was observed among them.

The optical layered bodies having an antiglare function of Examples 4 to 21 and 25 to 27, and Experimental Examples 1 to 10 all satisfied the respective requirements for the surface unevenness form, that is, 50 μm<Sm<600 μm, 0.1°<θa<1.5°, 0.02 μm<Ra<0.25 μm, and 0.30 μm<Rz<2.00 μm and had excellent optical properties.

The optical layered bodies of Examples 19 to 27 in which the low refractive index layer was formed were all found to have an extremely low value of the minimum reflectance as low as 0.8 to 1.1% and thus had more excellent optical properties.

On the other hand, the optical layered bodies of Comparative Examples 1 to 4 had a poor initial surface resistance value and were insufficient in the antistatic property, since they contained no polythiophene. Since containing no auxiliary conductive agent, the optical layered body of Comparative Example 6 had a poor initial surface resistance value and a poor surface resistance value after the light resistance test and was insufficient in the antistatic property and inferior in the production stability. The optical layered body of Comparative Example 5, which contained no leveling agent, was insufficient in the surface resistance value after the light resistance test although the initial surface resistance value was better than normal and inferior in the production stability, since the polythiophene unevenly existed near the outermost surface layer of the resin layer and also the auxiliary conductive agent was not arranged in proper positions defined in the present invention. In addition, in all of examples and experimental examples excluding Experimental Example 10, the polythiophene and auxiliary conductive agent were positioned at proper positions defined in the present invention and the initial surface resistance value and surface resistance value after a light resistance test were satisfactory.

The optical layered body of Experimental Example 1, which contained only a small amount of the polythiophene, was poor in the initial surface resistance value and surface resistance value after the light resistance test and was not provided with a sufficient antistatic property. On the other hand, the optical layered body of Experimental Example 2, which contained too large an amount of the polythiophene, was not provided with the desired high contrast. The optical layered bodies of Experimental Examples 3, 5, and 7, which contained only a small amount of the auxiliary conductive agent, were poor in the initial surface resistance value and surface resistance value after the light resistance test and insufficient in the antistatic property. On the other hand, the optical layered bodies of Experimental Examples 4, 6, and 8, which contained a large amount of the auxiliary conductive agent, were not provided with the desired high contrast or desired high total light transmittance. The optical layered body of Experimental Example 9, for which no additive having a protonic functional group (epoxy acrylate) was added, was slightly inferior in the dispersibility and stability of the polythiophene and slightly inferior in the initial surface resistance value and surface resistance value after the light resistance test. The optical layered body of Experimental Example 10, for which only PETA, a highly polar hydrophobic resin, was used as a binder resin, was insufficient in the initial surface resistance.

INDUSTRIAL APPLICABILITY

The optical layered body of the present invention can be used preferably for a cathode ray tube display device (CRT), a liquid crystal display (LCD), a plasma display (PDP), an electroluminescence display (ELD), a field emission display (FED), a touch panel, electronic paper, and the like.

The invention claimed is:

1. An optical layered body having a light transmitting substrate and a resin layer formed on one surface of said light transmitting substrate,
    wherein said resin layer comprises a binder resin, a polythiophene, an auxiliary conductive agent, a leveling agent, an antiglare agent and an additive having a protonic functional group which carries out a cross-linking reaction,
    the auxiliary conductive agent is carbon nanotubes,
    the resin layer has an antiglare function,
    the resin layer has an uneven surface shape and the uneven shape of the surface of the resin layer having an antiglare function is formed by using a resin layer composition containing an antiglare agent,
    the uneven shape of the resin layer satisfies the following expression in which the average interval of the projections and recesses of the resin layer surface is expressed as Sm; the average slanting angle of the uneven part is expressed as θa; the arithmetic mean roughness of the unevenness is expressed as Ra; and the ten point average roughness of the unevenness is expressed as Rz:

50 μm<$Sm$<600 μm 0.1°<$\theta a$<1.50°

0.02 μm<$Ra$<0.25 μm 0.30 μm<$Rz$<2.00 μm; and the resin layer is composed of a single layer and has a first region containing no auxiliary conductive agent from the interface on the opposite side to the light transmitting substrate to 100 nm; and
    wherein the resin layer further comprises
    (i) a second region wherein the auxiliary conductive agent exists from the interface of the resin layer on the light transmitting substrate side and a third region wherein the polythiophene exists and being located between the first region and the second region,
    or (ii) a second region wherein the auxiliary conductive agent exists from the interface of the resin layer on the light transmitting substrate side and a third region wherein the auxiliary conductive agent and polythiophene exist and being located between the first region and the second region.

2. The optical layered body according to claim 1, wherein the content of the polythiophene is 0.1 to 1.0 part by weight relative to 100 parts by weight of the binder resin.

3. The optical layered body according to claim 1, wherein the polythiophene is a complex with an anionic compound.

4. The optical layered body according to claim 1,
wherein the content of said auxiliary conductive agent is 0.001 to 0.13 parts by weight relative to 100 parts by weight of the binder resin.

5. The optical layered body according to claim 1,
wherein the initial surface resistance value and the surface resistance value after a light resistance test of the resin layer are less than $1 \times 10^{12} \Omega/\square$.

6. The optical layered body according to claim 1,
wherein the additive having a protonic functional group is an epoxy acrylate.

7. The optical layered body according to claim 1,
wherein a rough surface under coat layer is further formed on the light transmitting substrate and the resin layer is formed on said rough surface under coat layer.

8. The optical layered body according to claim 2, wherein the polythiophene is a complex with an anionic compound.

9. The optical layered body according to claim 2, wherein the initial surface resistance value and the surface resistance value after a light resistance test of the resin layer are less than $1 \times 10^{12} \Omega/\square$.

10. The optical layered body according to claim 3, wherein the initial surface resistance value and the surface resistance value after a light resistance test of the resin layer are less than $1 \times 10^{12} \Omega/\square$.

11. The optical layered body according to claim 1, wherein the content of the additive having a protonic functional group in the resin layer being 1 to 15 parts by weight relative to 100 parts by weight of the binder resin.

12. The optical layered body according to claim 1, wherein because of the bleeding of the leveling agent to the resin layer surface, the polythiophene can exist at a position close to the resin layer surface in the resin layer but not in the outermost surface.

13. The optical layered body according to claim 1, wherein the auxiliary conductive agent exists from the interface in the light transmitting substrate side to immediately under the position where the polythiophene exists in the resin layer.

14. The optical layered body according to claim 1, wherein the auxiliary conductive agent exists at the position same as the position where the polythiophene exists.

15. The optical layered body according to claim 1, wherein the auxiliary conductive agent exists at the position same as the position where the polythiophene exists to the interface of the resin layer in the light transmitting substrate side.

\* \* \* \* \*